US011864530B2

(12) United States Patent
Rard et al.

(10) Patent No.: US 11,864,530 B2
(45) Date of Patent: Jan. 9, 2024

(54) TEAT PREPARATION SYSTEM

(71) Applicants: Roy L. Rard, Conway, WA (US);
 Ronnie L. Medeiros, Littlefield, TX (US)

(72) Inventors: Roy L. Rard, Conway, WA (US);
 Ronnie L. Medeiros, Littlefield, TX (US)

(*) Notice: Subject to any disclaimer, the term of this patent is extended or adjusted under 35 U.S.C. 154(b) by 114 days.

(21) Appl. No.: 17/324,984

(22) Filed: May 19, 2021

(65) Prior Publication Data

US 2021/0267156 A1 Sep. 2, 2021

Related U.S. Application Data

(63) Continuation-in-part of application No. 17/009,561, filed on Sep. 1, 2020, now abandoned.

(60) Provisional application No. 62/960,875, filed on Jan. 14, 2020.

(51) Int. Cl.
 *A01J 7/04* (2006.01)
(52) U.S. Cl.
 CPC .................................... *A01J 7/04* (2013.01)
(58) Field of Classification Search
 CPC ............................................................ A01J 7/04
 See application file for complete search history.

(56) References Cited

U.S. PATENT DOCUMENTS

| 4,305,346 A * | 12/1981 | Sparr, Sr. | A61D 11/00 119/670 |
| 6,752,102 B2 * | 6/2004 | Dahl | A61K 45/06 119/14.47 |
| 9,247,708 B2 * | 2/2016 | Kochman | A01J 5/041 |
| 9,648,842 B1 * | 5/2017 | Mlsna | A01J 7/04 |
| 10,945,406 B2 * | 3/2021 | Neal | A01J 7/04 |
| 11,206,805 B2 * | 12/2021 | Stuessel | A01J 7/022 |
| 2008/0011241 A1 * | 1/2008 | Farina | A61D 1/02 119/673 |

(Continued)

*Primary Examiner* — Joshua D Huson
*Assistant Examiner* — Megan J Moroney
(74) *Attorney, Agent, or Firm* — Dean A. Craine, P.S.

(57) ABSTRACT

A teat preparation handpiece designed to fit around a teat on a bovine to sequentially clean the teat using high-pressure air and a pre-dip solution, then dry the teat using high-pressure air before milking. After milking, the handpiece is then used to atomize and apply a post-dip solution to the teat. The handpiece includes a teat receiving body with an exchangeable modified spray cylinder placed inside the teat receiving body's center bore. When the modified spray cylinder is placed inside the center bore, upper and lower raceways are formed between the walls of the teat receiving body and the modified spray cylinder that delivers high-pressure air, pre-dip solution and post-dip solution two sets of nozzles formed inside the modified spray cylinder. The modified spray cylinders may have different diameter center bores and configured to be exchangeable in the teat receiving body. In addition, the handpiece may include an optional defection cap configured to redirect high-pressure air, pre-dip solution or post-dip solution exiting the teat receiving body. The handpiece is part of a system that includes a control unit with a software program that controls the amount and delivery timing of pressure air, pre-dip solution, and post-dip solution to the handpiece.

14 Claims, 22 Drawing Sheets

(56) References Cited

U.S. PATENT DOCUMENTS

2012/0174873 A1\* 7/2012 Hiley .................. A01J 7/04
                                                                          119/670
2019/0133069 A1\* 5/2019 Stuessel ................ A01J 7/04

\* cited by examiner

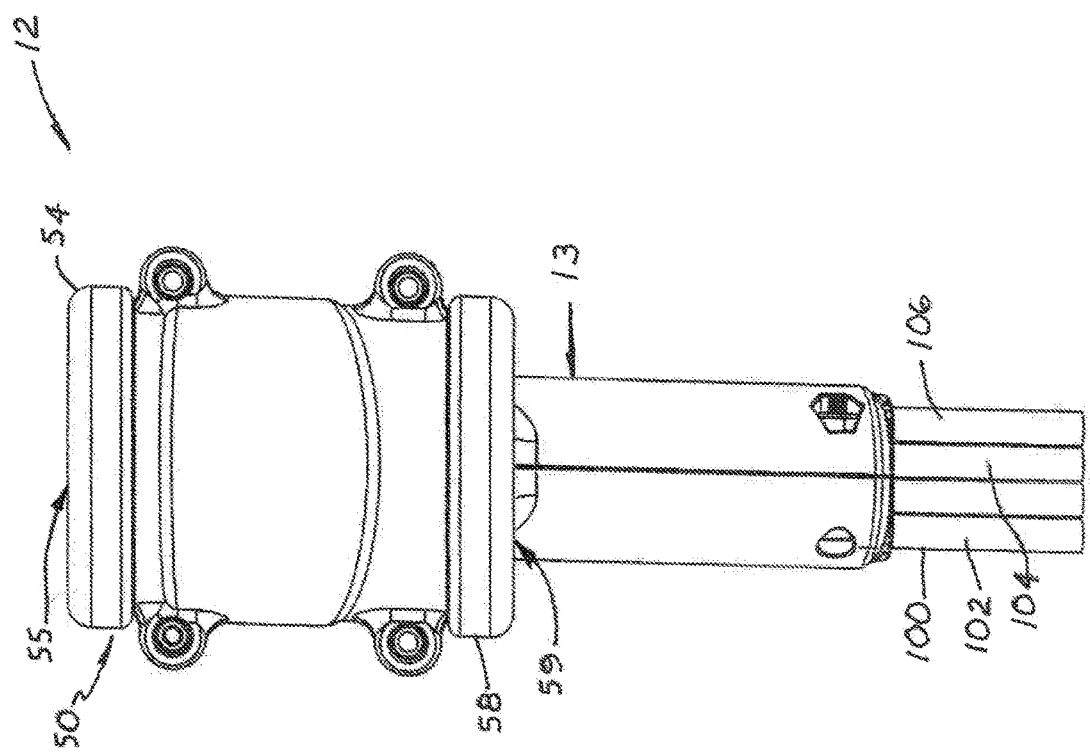

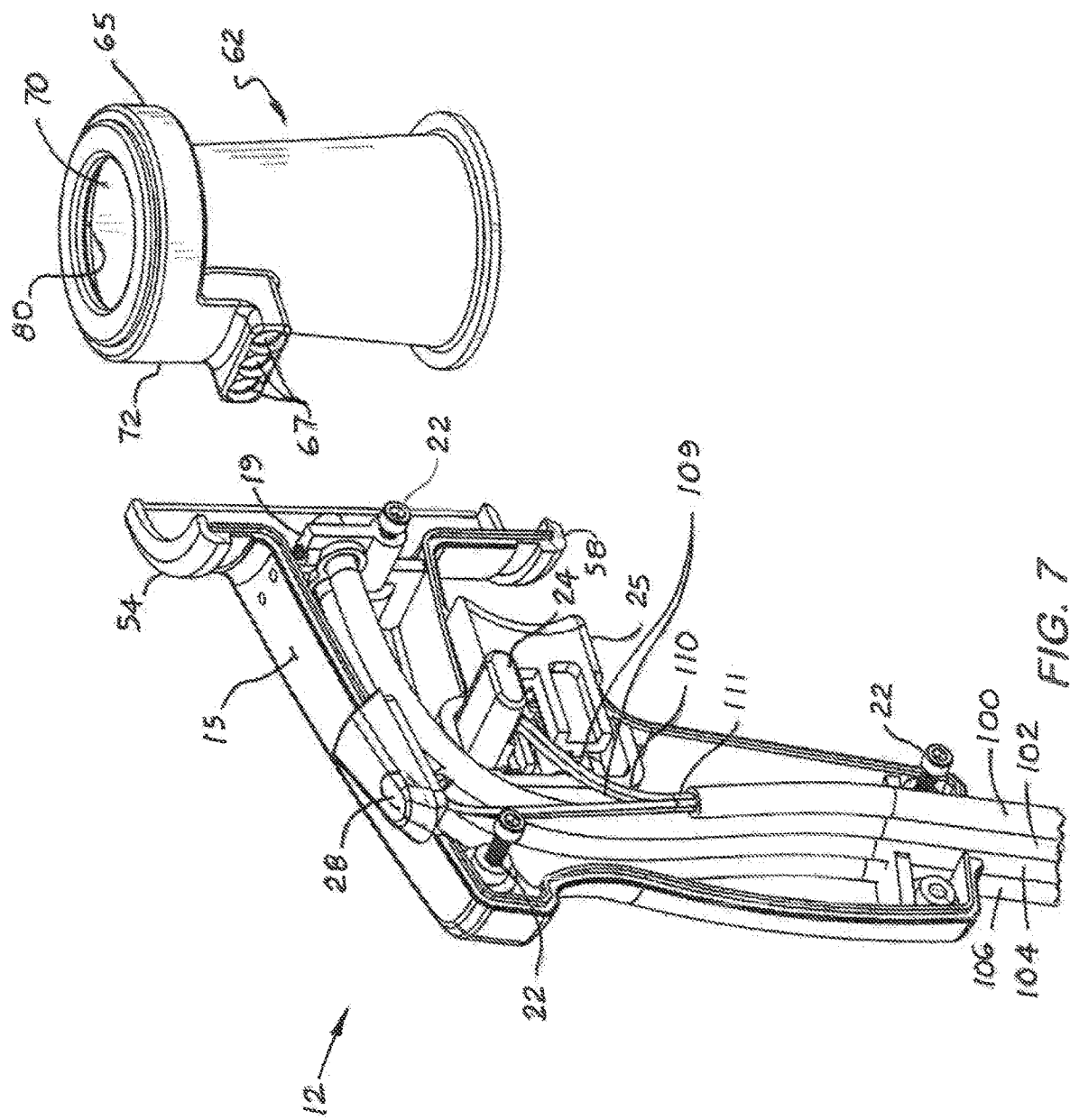

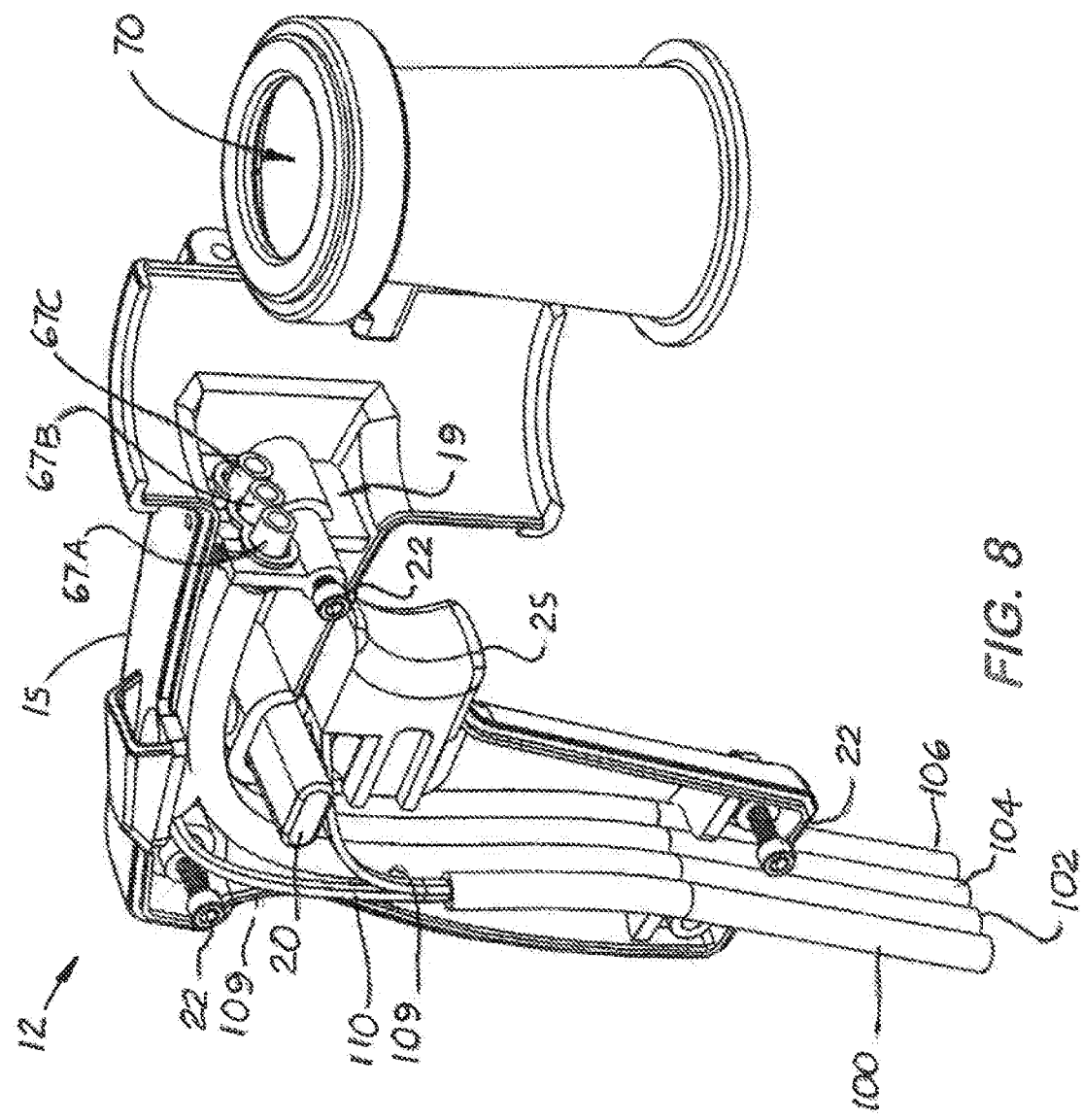

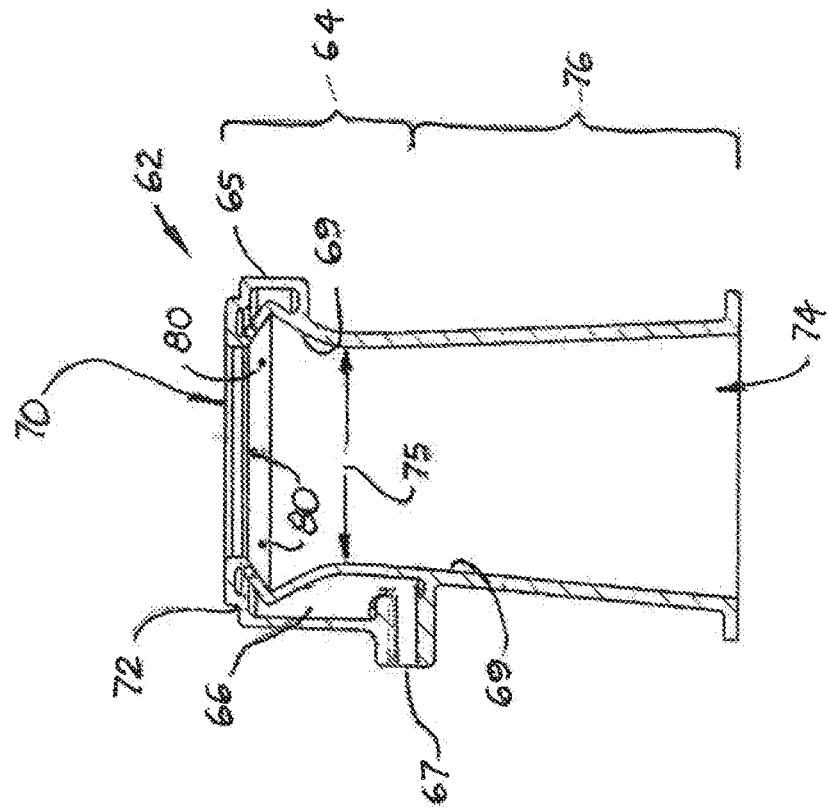
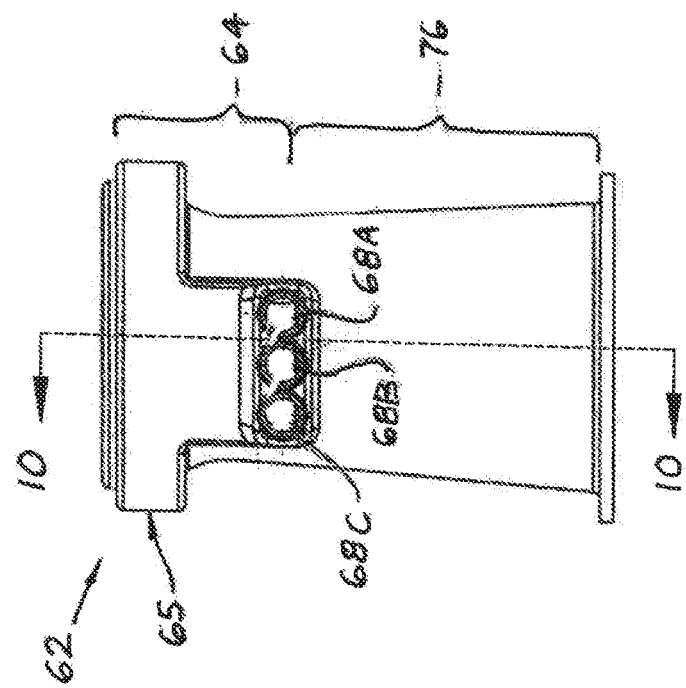
FIG. 10
FIG. 9

TEAT PREPARATION SYSTEM

This continuation-in-part patent application is based on and claims the priority date benefit of U.S. non-provisional patent application (application Ser. No. 17/009,561) filed on Sep. 1, 2020, which is based on and claims the filing date benefit of the U.S. Provisional patent application 62/960,875 filed on Jan. 14, 2020.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to devices that automatically clean, dry, and apply a post-dip solution to individual teats on a bovine.

2. Description of the Related Art

Dairy workers should follow good hygienic milking procedures to ensure the milk collected is safe to consume. For example, each teat should be thoroughly cleaned before milking. The cleaning task is performed by a worker who stands on one side or behind the cow and applies a cleaning solution. The pre-dip solution is usually an aqueous mixture containing 0.5% iodine, hydrogen peroxide or chlorine dioxide, or a combination. After all of the teats have been cleaned with the pre-dip solution, the worker then uses a dry towel to remove the pre-dip solution and any remaining dirt or debris. Hundreds of towels are used each day which is a substantial burden to dairy operators.

Before milking, all of the teats usually are 'stripped' to stimulate oxytocin release. While washing and drying the teat may partially stimulate oxytocin release, the worker will sometimes manually squeeze and pull each teat downward to further stimulate oxytocin release. The amount of stimulation is dependent on the worker's skill and the amount of time spent manually squeezing and pulling the teats.

After milking, the worker then manually applies a disinfecting solution, called a 'post-dip solution', to each teat. The post-dip solution contains a higher concentration of iodine and a thickening agent, making it more viscous than the pre-dip solution. The post-dip solution must be applied to the tip of each teat and given sufficient time to dry in place and form a protective layer.

Suppose the steps of applying and drying pre-dip solution, stipping the teat, applying the post-dip solution, and allowing the post-dip solution to dry to form a protective layer are not completed. In that case, milk from the cow may be contaminated, and infection may set in.

It is well known to dairy farmers that the size and shapes of teats on a cow vary. It is also well known to dairy farmers that the amount of dried mud on a cow's teats also varies. Variation in sizes and shapes of the teats and the amount of dried mud on the teats make consistently cleaning the teats on all cows in a dairy farm challenging.

Because the worker must stand to one side or behind the cow to reach all of the teats, areas of the teats opposite the worker are challenging to reach. As a result, some areas on the teat are not treated with a pre-dip solution, dried, stripped, nor treated with a post-dip solution.

What is needed is a teat preparation system that uses a single, lightweight handpiece that thoroughly cleans, evenly applies a pre-dip solution to each teat, and removes excessive pre-dip solution from each teat, and eliminates the use of cloth or paper towels.

What is also needed is a teat preparation system that also evenly applies a post-dip solution to the entire teat.

What is also needed is such a teat preparation system that can be easily modified to strip the teat.

What is also needed is a teat preparation system that uses exchangeable components that enable different sizes and shapes of teats to be cleaned, sprayed with a pre-dip solution, dried, and sprayed with a post-dip solution.

What is also needed is a teat preparation system that allows the user to adjust the operation of the handpiece to clean the teat when needed selectively.

SUMMARY OF THE INVENTION

A teat preparation system automatically and selectively cleans the teats individually on a bovine with high-pressure air and a pre-dip solution and then dries each teat after applying the pre-dip solution without using towels. The system is then used to apply a post-dip solution to each teat after milking.

The system includes a handpiece and a control unit. The handpiece is compact, lightweight and, configured to be held and operated with one hand. The handpiece which is made with durable components that stand up to rough use in a milking parlor, is connected to the control unit. The control unit controls the delivery of high-pressure air, a pre-dip solution, and a post-dip solution to the handpiece. During use, the handpiece is placed under a teat, and the control unit is activated. The handpiece includes a mode switch and a trigger that allows the user to manually control the delivery of the high-pressure air, the pre-dip solution, and the post-dip solution from the control unit to the handpiece.

The handpiece's teat receiving body includes a spray cylinder. Formed inside the spray cylinder is a teat receiving bore. The teat receiving body has a narrow top opening configured to receive and fit around a teat and a wide bottom opening through which high-pressure air and the pre-dip solution are discharged. The spray cylinder includes a wide upper section located below the body's top opening in which a plurality of downward aimed nozzles is positioned. The nozzles are arranged in a circular pattern on the inside surface of the wide upper section so that the entire surface of the teat is treated with high-pressure air and with the pre-dip solution. The sidewalls of the spray cylinder below the wide upper section extend inward, forming a narrow neck opening. The narrow neck opening partially restricts the downward flow of high-pressure air and the pre-dip solution. The sidewalls of the spray cylinder below the narrow neck opening extend downward and diverge. The combination of the wide upper section, the downward aimed nozzles, the narrow neck opening, and the diverging sidewalls of the spray cylinder create a venturi when high-pressure air flows downward in the spray cylinder.

Loaded into the memory of the control unit is a software program that controls the delivery of high-pressure air, pre-dip solution, and post-dip solution to the handpiece. The software program controls the sequence release of high-pressure air, pre-dip solution and post-dip solution and the length of time each is delivered to the handpiece. For example, after the pre-dip solution has been delivered to the handpiece for a predetermined amount of time and discontinued, the control unit momentarily continues to deliver high-pressure air to the handpiece to remove the excessive pre-dip solution from the teat. After a suitable amount of time, delivery of the high-pressure air is then discontinued. The handpiece is then removed from the teat. The teat is then manually stipulated or milked.

After milking, the handpiece is then repositioned under the teat, and high-pressure air is selectively delivered to the handpiece. As mentioned above, a venturi is created in the spray cylinder that draws the teat into the handpiece. Once the teat is drawn into the handpiece, the post-dip solution is then delivered to the handpiece. The high-pressure air is applied simultaneously with the post-dip solution, to atomizing the post-dip solution. After a predetermined amount of post-dip solution has been applied, the high pressurized air is discontinued and application of the post-dip solution continues for few seconds. The post-dip solution is then allowed to air-dry, therefore forming a wet layer of post-dip solution over the entire teat. The handpiece is then removed from the teat and the post-dip solution is allowed to air dry.

The handpiece includes a set of internal conduits that connect to external conduits connected to storage containers that hold the high pressured air, the pre-dip solution, and the post-dip solution. Each storage container is coupled to a solenoid that connects to the control unit. The control unit includes a programmable logic controller (also called a PLC). A software program controls the order the solenoids are opened and how long each solenoid is opened and closed. The software program is programmable enabling the operator to adjust when and how long the solenoids are activated.

The distal ends of the internal conduits in the handpiece connect to ports formed on the teat receiving body. In one embodiment, the distal ends of the conduits and the ports are horizontally aligned. In another embodiment, the distal ends of the conduits and the ports on the handpiece are vertically aligned, enabling an exchangeable teat received body to be used. In this embodiment, the exchangeable teat receiving body is modified and configured to be used with a modified spray cylinder, respectively. The modified spray cylinder can be manufactured in different sizes that enable the handpiece to be used with different sizes of teats.

In still another embodiment, a deflection cap may be integrally formed or attached to the lower edge of the spray cylinder or to the modified spray cylinder. The deflection cap curves downward and inward to a narrow apex. During use, the deflection cap redirects the high-pressure air, the pre-dip solution, and the post-dip solution inward to form a narrow stream. The user may manipulate the handpiece to redirect the stream of high-pressure air, pre-dip solution and post-dip solution in dirty, hard-to-reach areas. The software program may be programmed to allow the user to selectively redirect high-pressure air, or pre-dip solution, or post-dip solution from the handpiece.

In another embodiment, the handpiece is further modified to include an elastic bladder sleeve located inside a rigid, bladder frame. The bladder frame fits into a modified spray cylinder placed in the handpiece's teat receiving body. The bladder sleeve is configured to squeeze against the outside surface of a teat placed inside the teat receiving body. The bladder sleeve squeezes in a downward, milking-like manner against the sides of the teat to strip the teat after the pre-dip solution application and the drying steps have been completed.

DESCRIPTION OF THE DRAWINGS

FIG. 5 is a front elevational view of the handpiece.
FIG. 7 is a sectional, partially exploded, rear perspective view of the handpiece.
FIG. 8 is a sectional, partially exploded, front perspective view of the handpiece.
FIG. 9 is a rear elevational view of the spray cylinder.
FIG. 10 is a sectional side elevational view of the spray cylinder shown in FIG. 9.

DESCRIPTION OF THE PREFERRED EMBODIMENT(S)

Figure 1:
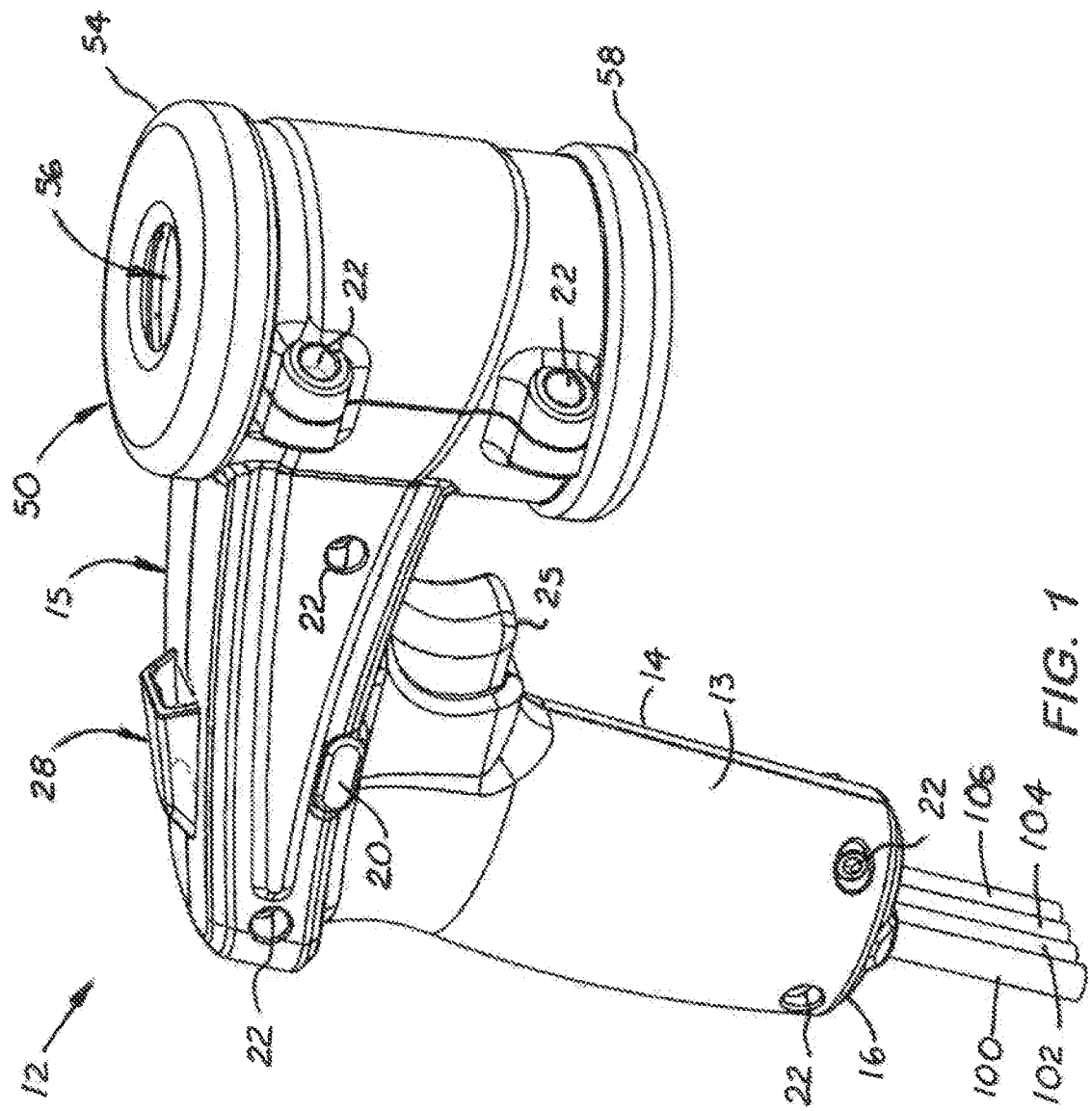
FIG. 1 illustrates the teat preparation system disclosed herein that includes a handpiece connected to a control unit.
Figure 2:
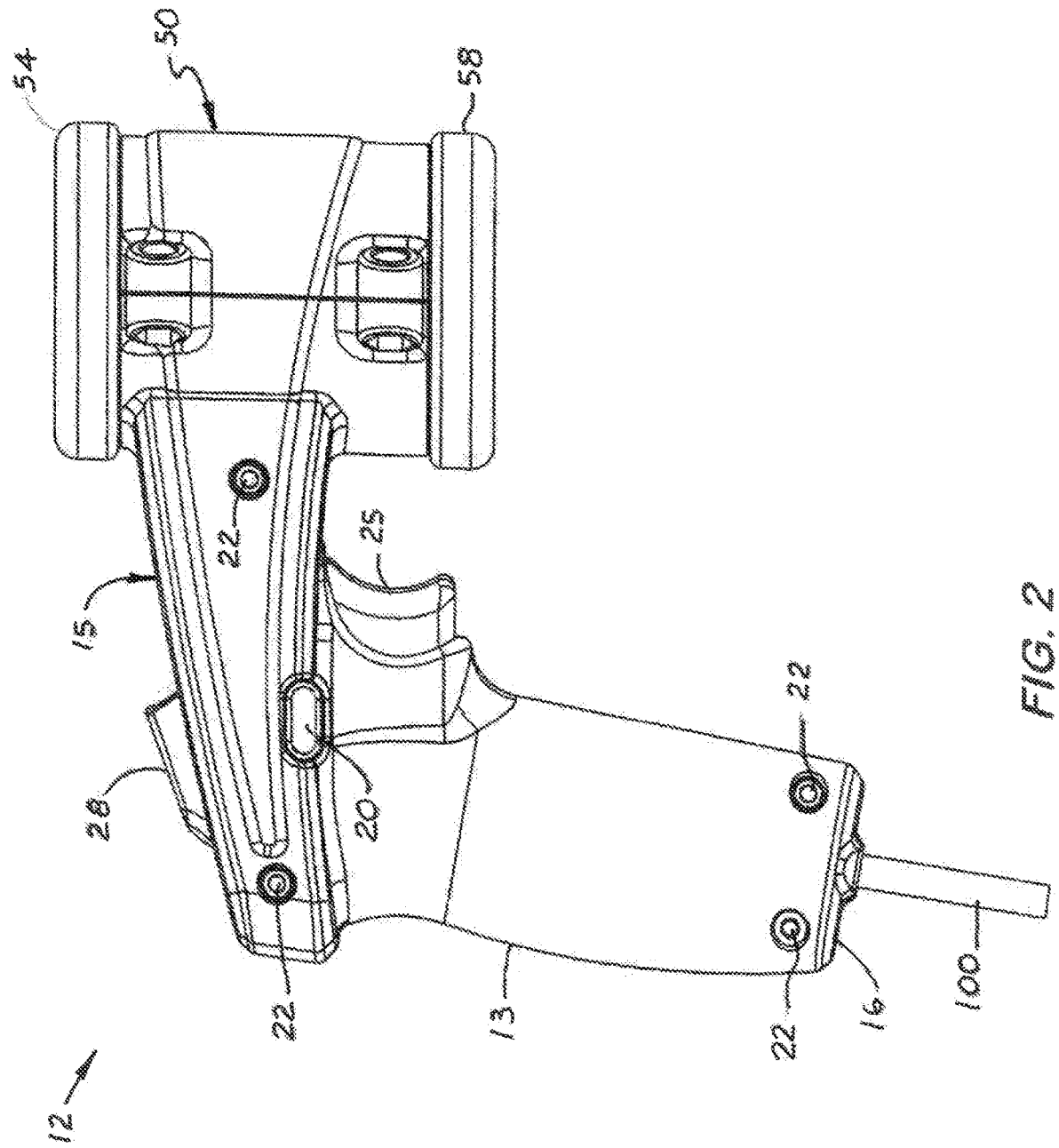
FIG. 2 is a side elevational view of the handpiece.
Figure 4:
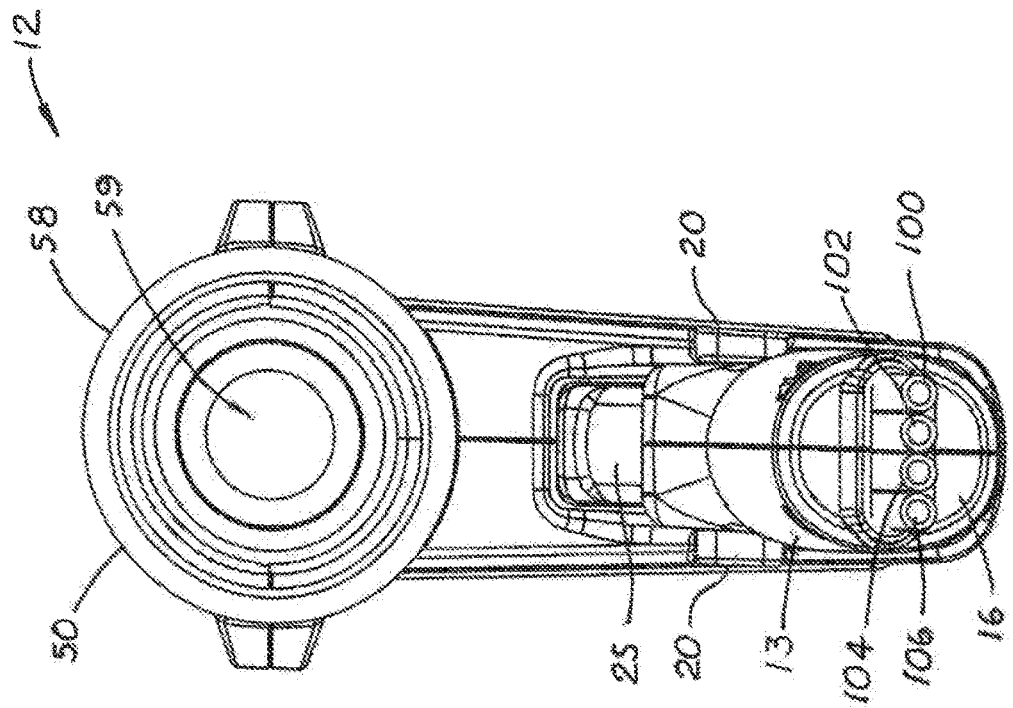
FIG. 4 is a bottom plan view of the handpiece.
Figure 3:
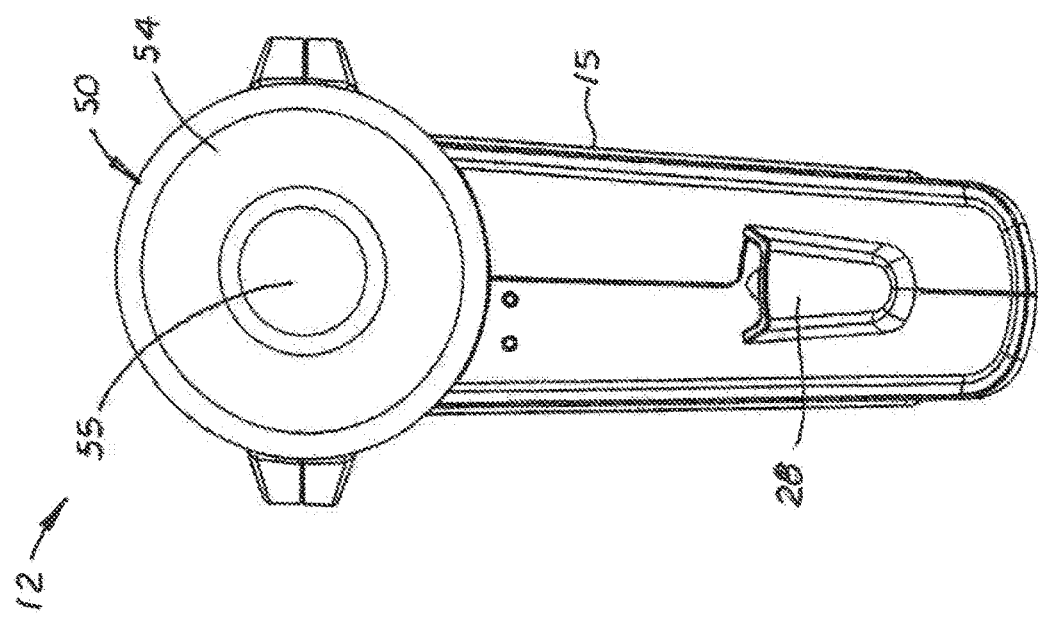
FIG. 3 is a top plan view of the handpiece.

FIG. 1 shows a first embodiment of a teat preparation system 8 used to automatically and selectively clean each teat 5 on a bovine with a pre-dip solution 121, then dry each teat 5 without using towels, and then apply a post dip solution 127 to each teat 5 after milking. System 8 includes a handpiece 10 connected to a control unit 90 that controls the delivery of high-pressure air 115, a pre-dip solution 121, and a post-dip solution 127 to the handpiece 10.

As shown in FIGS. 1-5, the handpiece 10 is a two-part, clamshell structure that forms a hollow handgrip section 12, a hollow upper body 15, and a hollow teat receiving body 50. Mounted on the side of the upper body 15 is a mode switch 21. Mounted on the front surface of the handgrip section 12 is a trigger button 25. Mounted on the top surface of the upper body 15 is an optional light 28. The two half-sections 12A, 12B of the handgrip section 12, the upper body 15, and the teat receiving body 50 are integrally formed and connected via thread connectors 22.

Formed or attached to the handgrip section 12 is a trigger housing 23 containing a trigger switch 26. Mounted over the trigger switch 26 is a trigger button 25, hereinafter called a trigger. The upper body 15 includes a mode switch housing 18 and a the mode switch 21. Located inside the mode switch housing 18 is a sliding mode button 20 that moves the mode switch 21. Near the distal end of the proximal end 13 of the handpiece 12 is a conduit end support plate 19.

Formed on the upper body 15 is a cylindrical teat receiving body 50. The teat receiving body 50 is made up of two half-shell structures joined with threaded connectors 22.

The teat receiving body 50 includes an outer housing 52. Formed or attached to the upper end of the outer housing 52 is an upper cap 54. Formed or attached to the lower end of the outer housing 52 is a lower cap 58. Formed on the upper cap 54 is a top opening 55 and formed on the lower cap 58 is a lower opening 56. Located inside the outer housing 52 is an inner cavity 53.

Figure 11:
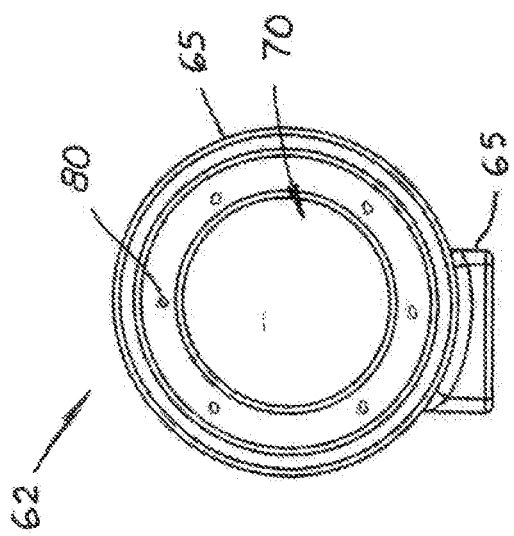
FIG. 11 is a top plan view of the spray cylinder.
Figure 12:
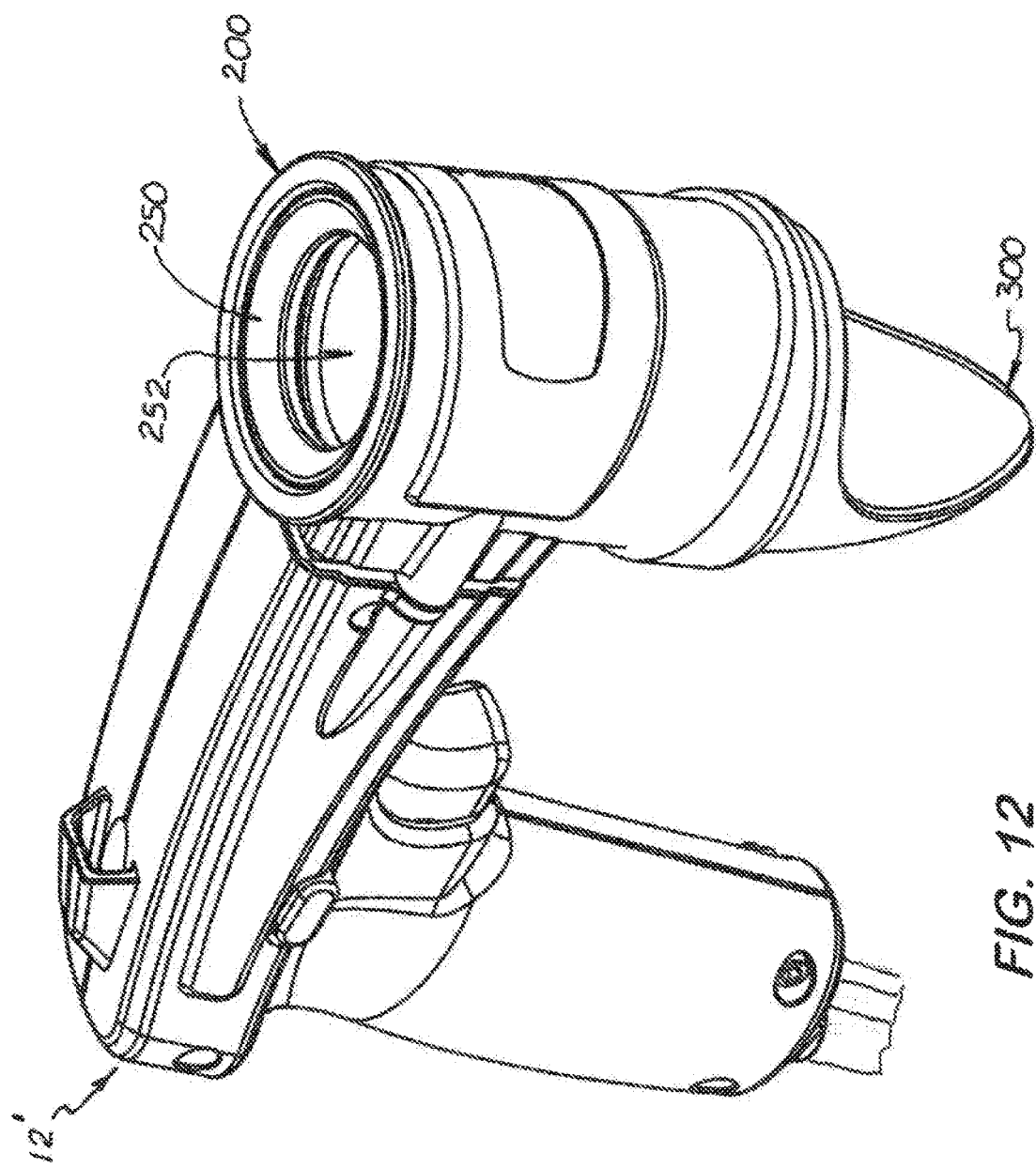
FIG. 12 is a perspective view of another embodiment of the handpiece.
Figure 13:
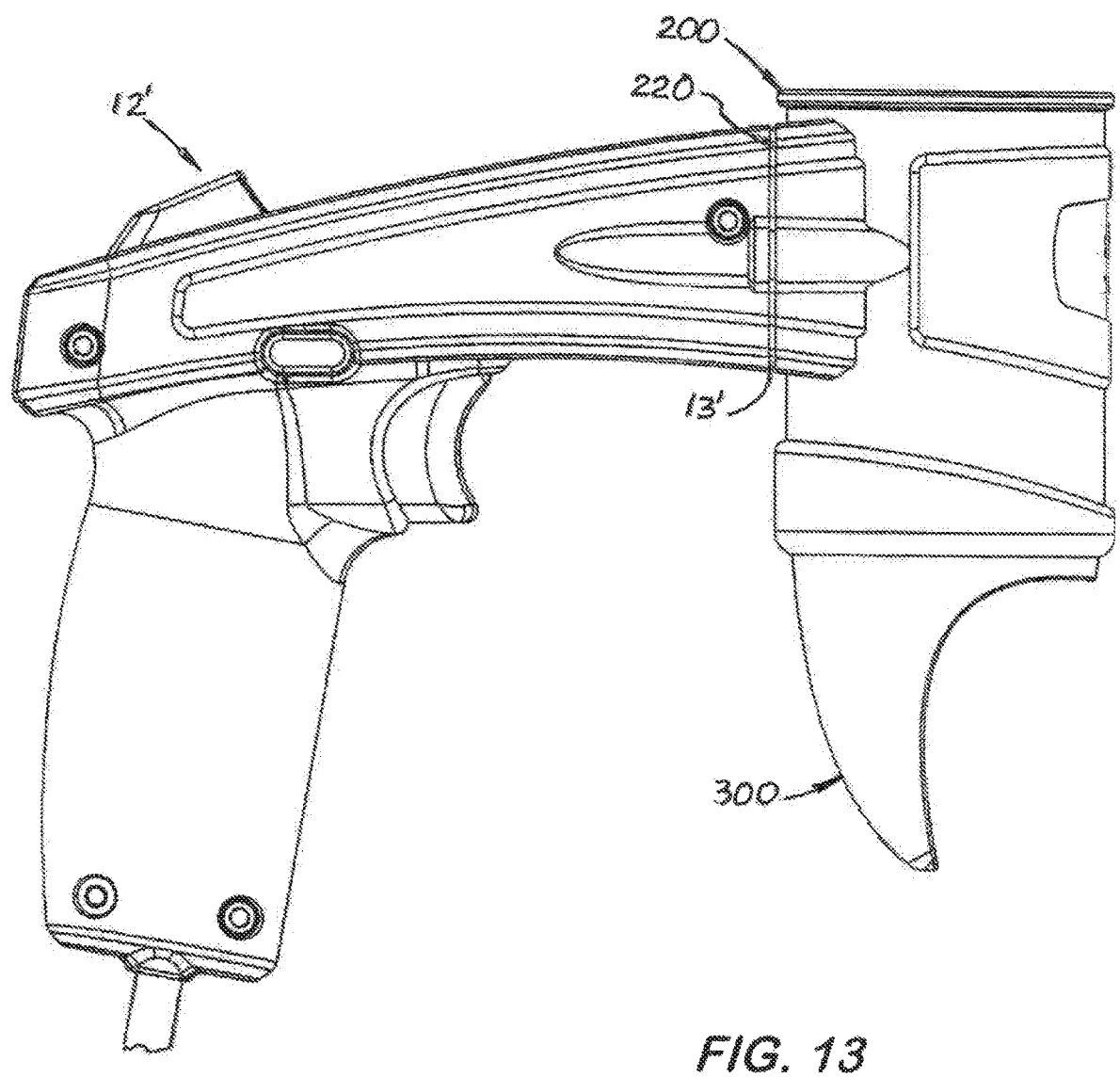
FIG. 13 is a left-side elevational view of the handpiece shown in FIG. 12.

Located inside the inner cavity 53 is a cylindrical spray cylinder 62. FIGS. 9, 10, and 11 show that the spray cylinder 62 includes an integrally formed upper section 64 and a lower section 76. Formed inside the spray cylinder 62 is a center bore 63. Integrally formed on the upper section 64 is a collar-shaped outer housing 65. Formed inside the outer housing 65 is a closed, circular mixing cavity 66. Formed on the lower inside surface of the outer housing 65 are air and fluid receiving ports 68A, 68B, and 68C that communicate with the mixing cavity 66. The outer housing 65 and the mixing cavity 66 extend entirely around the spray cylinder 62.

The spray cylinder 62 includes a narrow top opening 70 configured to fit under the upper cap 54. The top opening 55 of the upper cap 54 and the top opening 70 are sufficiently wide to receive the upper portion of a teat 5. Formed on the lower end of the spray cylinder 62 is a wide bottom opening 74. During assembly, the wide bottom opening 74 is located just inside the lower cap 58.

As shown in FIG. 10, the spray cylinder 62 includes a wide upper section 72 near the narrow top opening 70. Located below the top opening 70 is a plurality of downward aimed nozzles 80. The nozzles 80 are arranged in a circular pattern on the inside surface of the spray cylinder 62, so the entire surface of a teat 5 may be treated with high-pressure air 115, a pre-dip solution 121, and a post-dip solution 127. The sidewalls 69 of the spray cylinder 62 below the wide upper section 72 extend inward, forming a narrow neck opening 75 that partially restricts the downward flow of high-pressure air 115, the pre-dip solution 121, and the post-dip solution 127 through the spray cylinder 62.

The lower section 76 of the spray cylinder 62 below the narrow neck opening 75 is a conical shape, diverging and terminates at the spray cylinder's wide bottom opening 59. The combination of the wide upper section 72, the downward aimed nozzles 80, the narrow neck opening 75, and the diverging, conical-shape lower section 76 all act to create a suction that pulls a teat 5 into the spray cylinder 62 when the teat 5 is positioned % to ⅓ inch above the top opening 70. Because a teat 5 after milking is flaccid, the suction is also used as a stretching force that causes the teat 5 to stretch longitudinally so that post-dip solution 127 may be applied to the creases and folds commonly found a flaccid teat 5.

Figure 6:
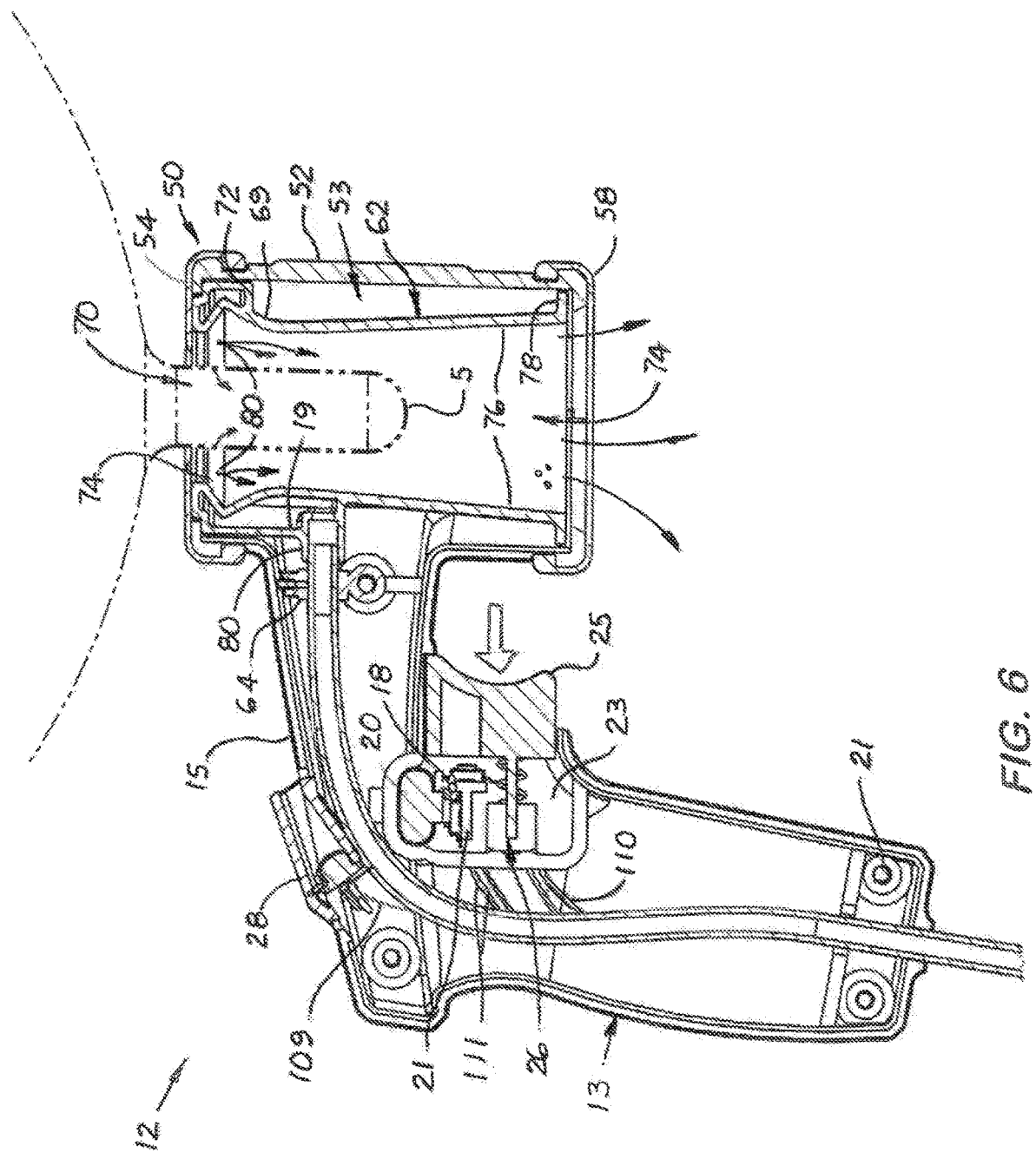
FIG. 6 is a sectional, side elevational view of the handpiece.

As shown in FIGS. 6-8, the handpiece 12 includes a set of internal conduits 102, 104, and 106 that extend from ports 67A, 67B, 67C formed on a transversely aligned conduit end support plate 19 located in the upper body 15. The internal conduits 102, 104, and 106 extend through the bottom end 16 of the handpiece 12 and connect to external conduits 114, 120, and 126, respectively. The external conduits 114, 120, and 126 carry high-pressure air 115, pre-dip solution 121, and post-dip solution 127, respectively, to the handpiece 12. During use, high-pressurized air 115, pre-dip solution 121, and post-dip solution 121 is delivered via the external conduits 114, 120, 126 to the internal conduits 102, 104, and 106, and then to the ports 67A, 67B and 67C, respectively. The high-pressurized air 115, pre-dip solution 121, and post-dip solution 127 is then separately delivered to the ports 67A, 67B, and 67C, respectively, formed on the outer housing 65 on the spray cylinder 62. The high pressurized air 115, pre-dip solution 121, and post-dip solution 127 is then delivered to the circular large mixing cavity 66. The high-pressure air 115, pre-dip solution 121, and post-dip solution 127 then exit the mixing cavity 66 through the nozzles 80 and flow against the teat 5.

Extending into the handpiece 12 is an electrical cable 100 that contains wires 109, 110, and 111 that connect to the light 28, the mode switch 21, and the trigger switch 26, respectively. The end of electrical cable 100 connects to the control unit 90.

FIGS. 12-19 show another embodiment of the handpiece 12' that has been modified to be used with a modified teat receiving body 200 that can be used with an exchangeable modified spray cylinder 250. The teat receiving body 200 is a cylindrical structure designed to be selectively attached to the proximal end 13' of the handpiece 12' with two threaded connectors 22. The handpiece 12' is nearly identical to the handpiece 12 shown in FIGS. 1-6 but with high-pressure port 67A, a pre-dip solution port 67B, and post-dip solution port 67C aligned vertically on the proximal end 13'.

The teat receiving body 200 includes a mounting surface 220 that presses against the proximal end 13' on the handpiece 12'. Formed on the mounting surface 220 is a high-pressure air port 222, a pre-dip port 224, and a post-dip port 226. Ports 222, 224, and 226 are vertically aligned and spaced apart with ports 67A, 67B ad 67C, respectively, formed on the proximal end 13' on the handpiece 12'. When the teat receiving body 200 is pressed against the proximal end 13' on the handpiece, the ports 222, 224, and 226 are configured to slide into ports 67A, 67B, and 67C, respectively. The connectors 22 force the teat receiving body 200 against the proximal end 13', and the adjacent ports are forced together to create airtight seals between them.

The teat receiving body 200 includes a center bore 202 divided into an upper cylindrical space 262 and a lower cylindrical space 270. The air pressure port 222, the pre-dip port 224, and the pos-dip port 224 formed on the teat receiving body 200 extend inward and communicate with the center 202. The spray cylinder 250 fits into and rests inside the center bore 202. The teat receiving body 200 has downward diverging sidewalls 216 that create a venturi and produce a suction force that draws the teat 5 into the top opening 204.

Figure 18:
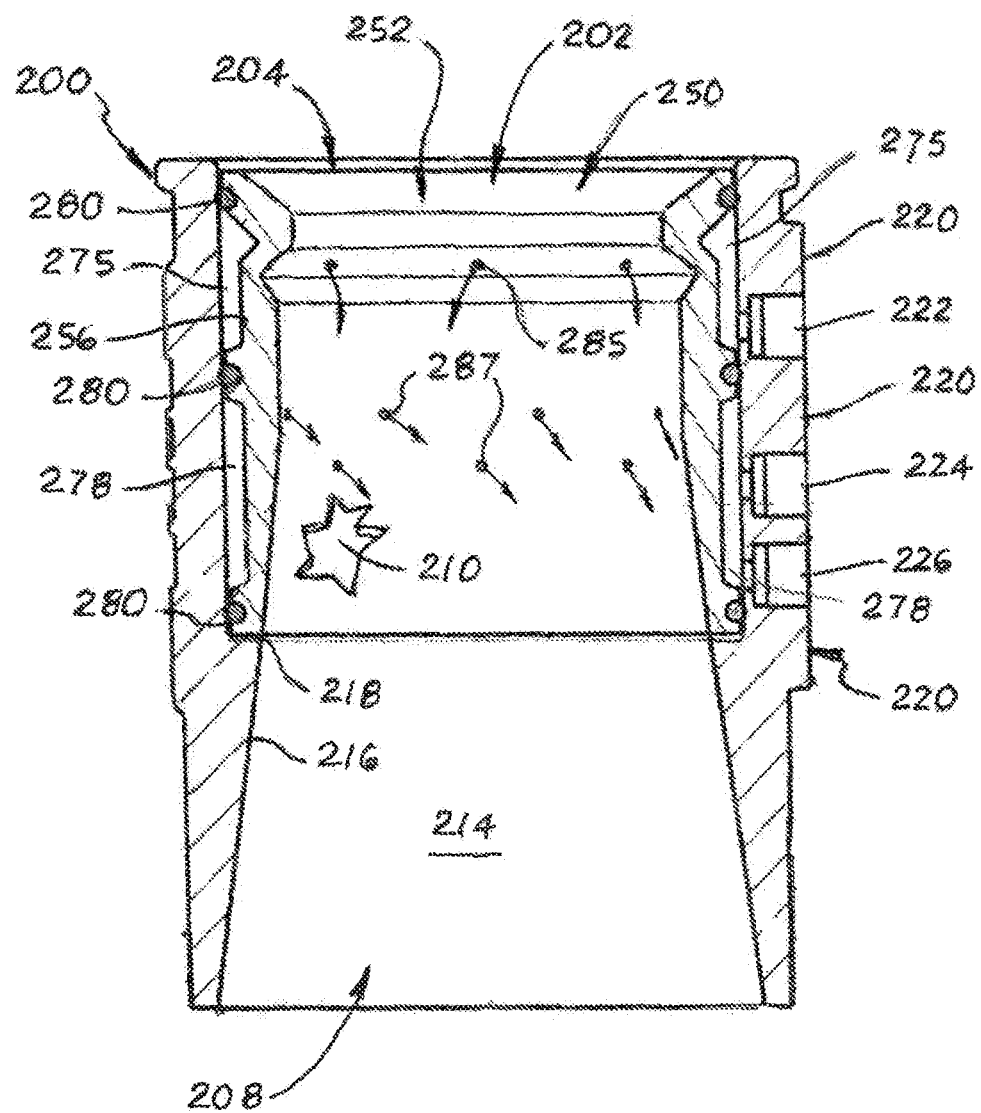
FIG. 18 is a section, side elevational view of spray cylinder used in the handpiece shown in FIG. 12.

Spray cylinder 250, shown in FIG. 18, is a separate structure and configured to slide into the center bore 202 formed in the teat receiving body 200. Spray cylinder 250 includes a central bore 252' with a narrow top opening 25 and a bottom opening 255. The sidewalls 256' of the spray cylinder 250 below the top opening 254 extend inward, forming a narrow neck opening 257 that partially restricts the downward flow of high-pressure air 115, the pre-dip solution 121, and the post-dip solution 127 through the spray cylinder 250.

Like spray cylinder 62, the lower space 270 of the spray cylinder 250 below the narrow neck opening 254 is a conical shape, diverging and terminates at the spray cylinder's bottom opening 255. The lower end surface 260 of the spray cylinder 250 rests on a stop edge 218 formed on the inside surface of the teat receiving body 200.

As stated above, the spray cylinder 250 is selectively inserted into the teat receiving body's center bore 202 (shown more clearly in FIG. 14) As shown in FIG. 18, the outer surfaces of the sidewall 256 of the spray cylinder 250 is configured to form two circular, raceways 275, 278 when the spray cylinder 250 is inserted into the teat receiving body 200. Three O-rings 280 are attached to the spray cylinder's exterior surface above and below the raceways 275, 278 to isolate the two raceways 275, 278 from each other and prevents leakage into the center bore 202.

When inserted into the teat receiving body 200, the upper raceway 275 is aligned with the high-pressure air port 222 extending into the center bore 202. The lower raceway 278 is larger than the upper raceway 275 and is aligned with the pre-dip port 224 and the post-dip port 226.

Formed on the inside surface of the spray body 250 adjacent to the upper raceway 275 is a first set of high-pressure air nozzles 285. During use, high-pressure air 115 is delivered via the high-pressure air port 222 to the teat receiving body 200 and flows into upper raceway 275 and exits the high-pressure air nozzles 285. Pre-dip solution 121 and post-dip solution 127 are delivered to the lower raceway 278 and exit through the liquid port nozzles 287 that communicate with the lower cavity 278.

Figure 14:
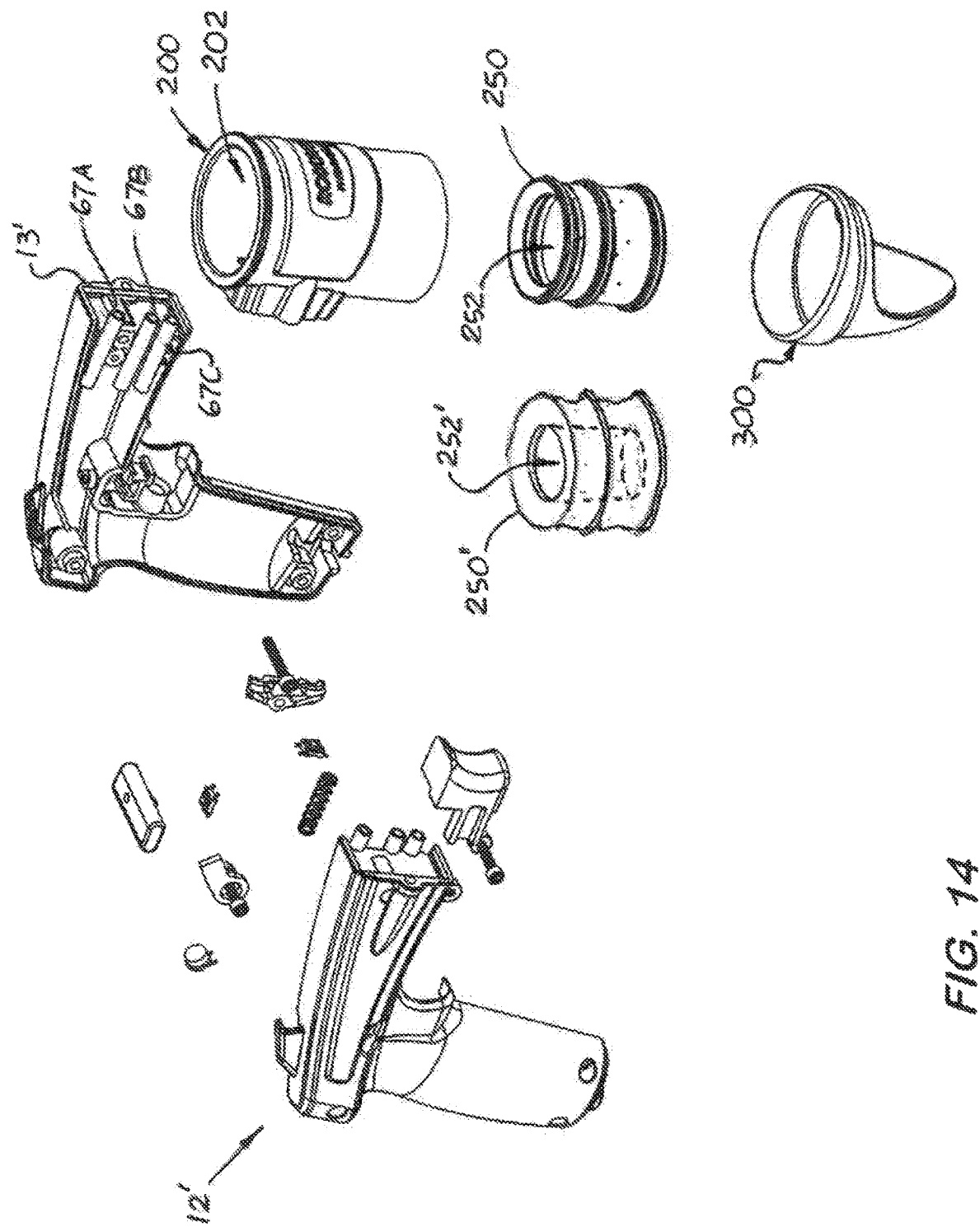
FIG. 14 is an exploded, perspective view of the handpiece shown in FIG. 12.

As stated above, the spray cylinders 250 are configured to be exchangeable in the teat receiving body 200. A second spray cylinder 250' is shown in FIG. 14 with a center bore 252 with a smaller diameter center bore 252', enabling the handpiece 12' to be used with teats that have different sizes and shapes.

In the embodiment shown in the Figs., there are six to eight air nozzles 285 and twelve to sixteen liquid nozzles 287. All ports 285, 287 are aimed downward at 30 to 45 degrees. One or all ports 285, 287 may also be aimed laterally thereby forcing the air and liquids to travel in a circular path along the inside surface of the spray cylinder 230. It should also be noted that the type and number of nozzles 285, 287 formed on the spray cylinders 250 may also vary. Because the control unit 90 is programmable by the manufacturer, the control unit 90 may include optional mode settings that allow a user to use different spray cylinders (not shown) with a different arrangement of nozzles for different operational modes.

Also, as shown in FIG. 12-15 and 17, a deflection cap 300 may be integrally formed or attached to the modified spray cylinder 250s lower edge. The deflection cap 300 is configured to re-focus and concentrate the high-pressure air, pre-dip solution and post-dip solutions exiting the lower section of the teat receiving body into a narrow stream. The deflection cap 300 has a complex curved outer body that curves inward and forms a point. The stream of air, pre-dip solution and post dip solution is narrow and redirected approximately 20 to 45 degrees from the horizontal axis. By narrowing and re-focusing the stream inward, overspray is prevented. The user while holding the handpiece to aim the stream of the high-pressure air 115, pre-dip solution 121 and/or post-dip solution 127 to excessively dirty or hard-to-reach areas on the teat or udder. It should be understood that the deflection cap 112 may also be integrally formed or attached to the handpiece shown in FIGS. 1-8.

In all of the above embodiments shown in FIGS. 1-18 and described above, each handpiece 12, 12' is a part of a system 8 that includes a control unit 90. The control unit 90 includes programmable logic control, called a PLC indicated by reference number 92, with a software program 95 loaded into its working memory. The PLC 92 and the software program 95 are configured to precisely control the delivery of high-pressure air 115, pre-dip solution 121, and post-dip solution 127 to the handpiece 12. As shown in FIG. 18, the control unit 90 is connected to a first solenoid 112, a second solenoid 118, and a third solenoid 124. The first solenoid 112 is connected to a pressurized air source 113 and to an external conduit 114 that connects to the internal conduit 102 inside the handpiece 12. The second solenoid 118 is connected to a pre-dip solution source 119, and the external conduit 120 connects to an internal conduit 102 inside the handpiece 12. The pre-dip solution 121 may be delivered to an optional heater 128 connected to the conduit 120 that pre-heats the pre-dip solution 121 to approximately 90 to 120 degrees F. before delivery to the internal conduit 102.

Third solenoid 124 is connected to a post-dip solution source 125 and an external conduit 126 that connects to internal conduit 106 inside the handpiece 10. The third solenoid 124 may also be connected to an optional heater 129 connected to the conduit 126 that pre-heats heats the post-dip solution 127 to approximately 90 to 120 degrees F. before delivery to the nozzles 80.

As discussed further below, the software program 95 is configured to control when and how long each solenoid 112, 118, and 124 opens and closes. During use, the operator manipulates the mode switch 21 to select one of two operating modes—a pre-dip solution application mode: and a post-dip solution application mode. The two modes determine which solenoid opens and closes and how long. The operator then manipulates trigger 25 to initiate the operating mode selected by the mode switch 21.

Operation of the Cleaning, Pre-Dip Application, and Post-Dip Solution Embodiment When the mode switch 21 is moved to the first mode position, and the operator presses the trigger 25, the PCL 92 is activated, which runs the first stage mode routine. During the first mode routine, the software program 95 and the PLC 92 opens the first solenoid 112 connected to the pressure air source 113 containing high-pressure air 115 (approximately 150 PSI). During the first mode routine, the second solenoid 118 is opened simultaneously with the first solenoid 112. When the second solenoid 118 is opened, pre-dip solution 121 is delivered to the handpiece 10. When the second solenoid 118 is activated, the optional heater 129 may also be activated to heat the pre-dip solution 121.

The software program 95 is configured to open both the first and second solenoids 112, 118, respectively, when trigger 25 is continuously pressed. Both high-pressure air 115 and the pre-dip mixture 121 are delivered to the handpiece 12 and discharged from the nozzles 80. The first and second solenoids 112, 118 remain open as long as trigger 25 is pressed.

When trigger 25 is released, the software program 95 is configured to immediately close the second solenoid 118, thereby discontinuing the pre-dip solution 121 to the nozzles 80. In addition, the software program 95 controls the PLC 92 so that the first solenoid 112 remains open for approximately 2 seconds after the second solenoid 118 closes, allowing only high-pressure air 115 to flow from the nozzles 80 and remove excessive pre-dip solution 121 from the surface of the teat 5. If the operator presses the trigger 25 again while the first solenoid 112 is opened and the second solenoid 118 is closed, the first stage mode routine automatically re-runs.

When the mode switch 21 is moved to the post-dip application mode position and the trigger 25 is pressed, the PCL 92 runs the second stage mode routine. In the second stage mode routine, the first solenoid 112 opens to deliver high-pressure air 115 to the nozzles 80. The first solenoid 112 is open as long as the trigger 25 is pressed. When trigger 25 is released, the third solenoid 124 opens to deliver post-dip solution 127. If the third solenoid 124 is connected to an optional heater 129, the post-dip solution 127 is heated before delivery to the handpiece 12.

When trigger 25 is released, the first solenoid 112 remains open for 0.25 to 0.5 seconds, allowing high-pressure air 115 to be released from the nozzles 80 and mixed with the post-dip solution 127. The mixture of high-pressure air 115 and post-dip solution 127 causes the post-dip solution 127 to atomize and spread across the entire surface of the teat 5. The software program 95 is also configured to keep the third solenoid 124 open 0.25 to 0.5 seconds after the first solenoid 112 closes so that the entire teat 5 is wetted with post-dip solution 127.

Stripping Embodiment

Figure 19:
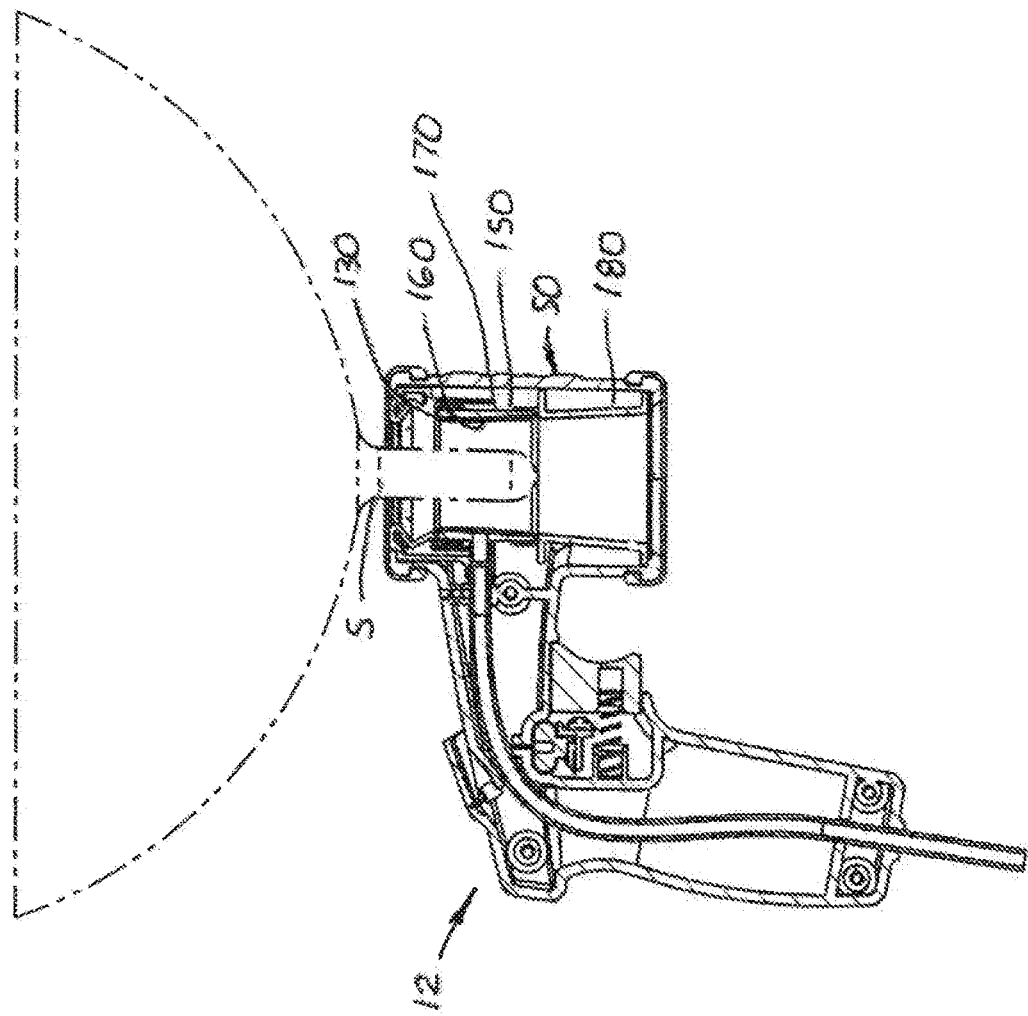
FIGS. 19, 20, and 21 are sequential, side elevational views of a stripping embodiment of the invention that includes an expandable, elastic bladder sleeve
Figure 20:
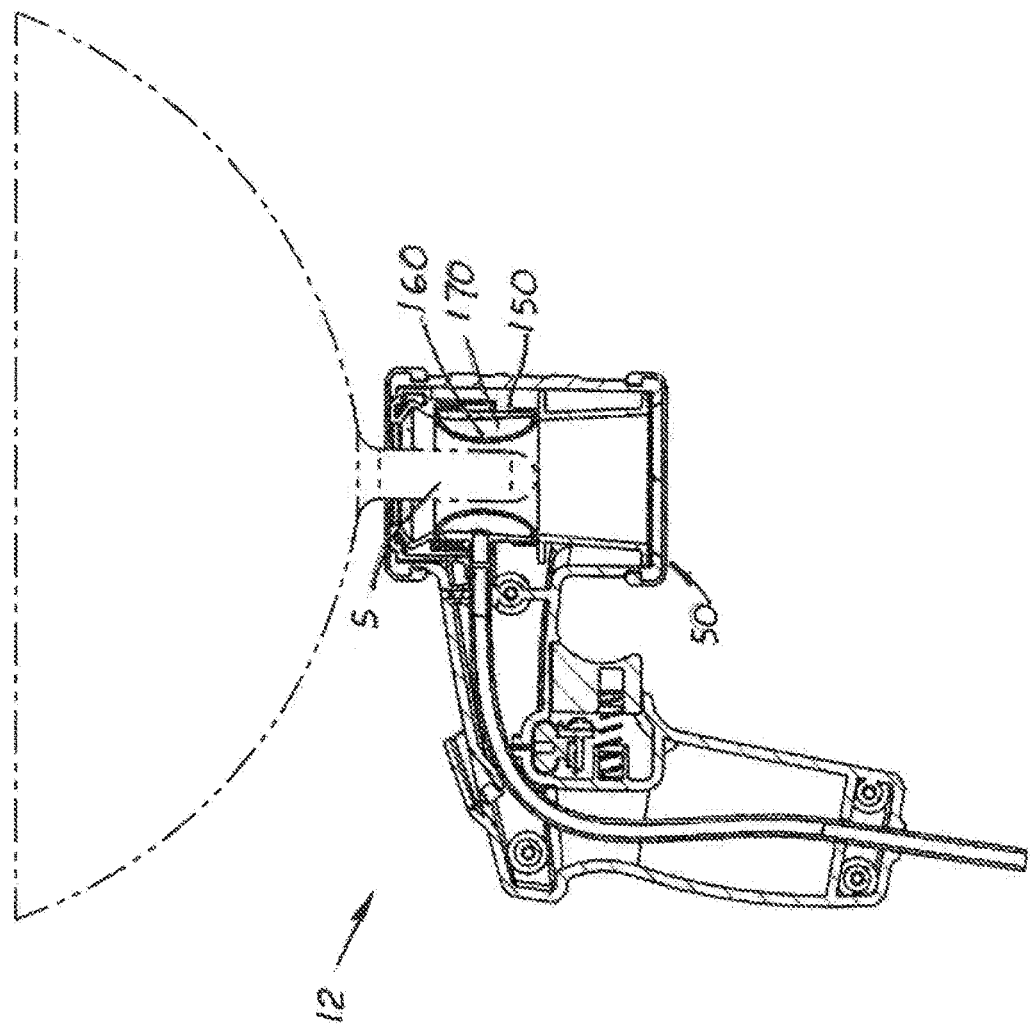
Figure 21:
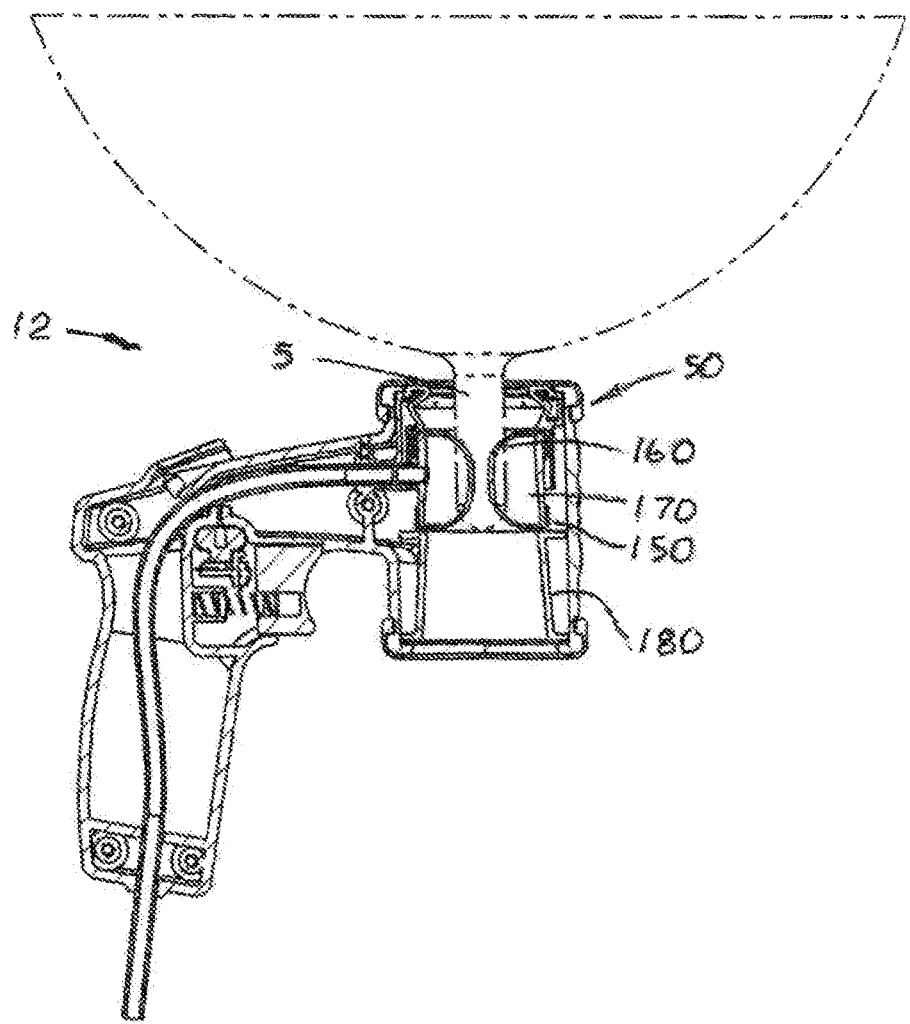
Figure 22:
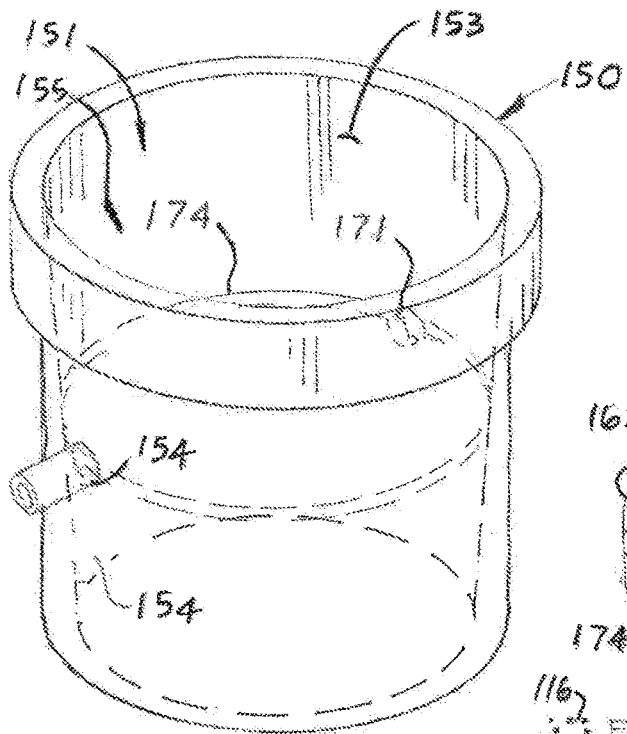
FIG. 22 is a front perspective view of the bladder frame used in the embodiment shown in FIGS. 19-21.

FIGS. 19-21 show another embodiment of system 8 that includes the handpiece 12 or 12' and control unit 90 used in the first embodiment discussed above. In this embodiment, the software program is re-programmed or replaced by a modified software program 96, and the spray cylinder 62 is replaced by a stripping spray cylinder 130. The stripping spray cylinder 130 includes the same upper section 64 with an outer housing 65, a mixing cavity 66, and nozzles 80. During use, a teat 5 is placed over the top opening of the upper section 64 and drawn into the center bore. High-pressure air 115, pre-dip solution 121, and post-dip solution 127 are then delivered to and dispensed from the nozzles 80 described above in the spray cylinder 62, 250.

The stripping spray cylinder 130 is configured to rest over a cylindrical, inflating member 140 placed inside the teat receiving body 50. The inflating member 140 is stacked above a short conical support structure 180.

Figure 15:
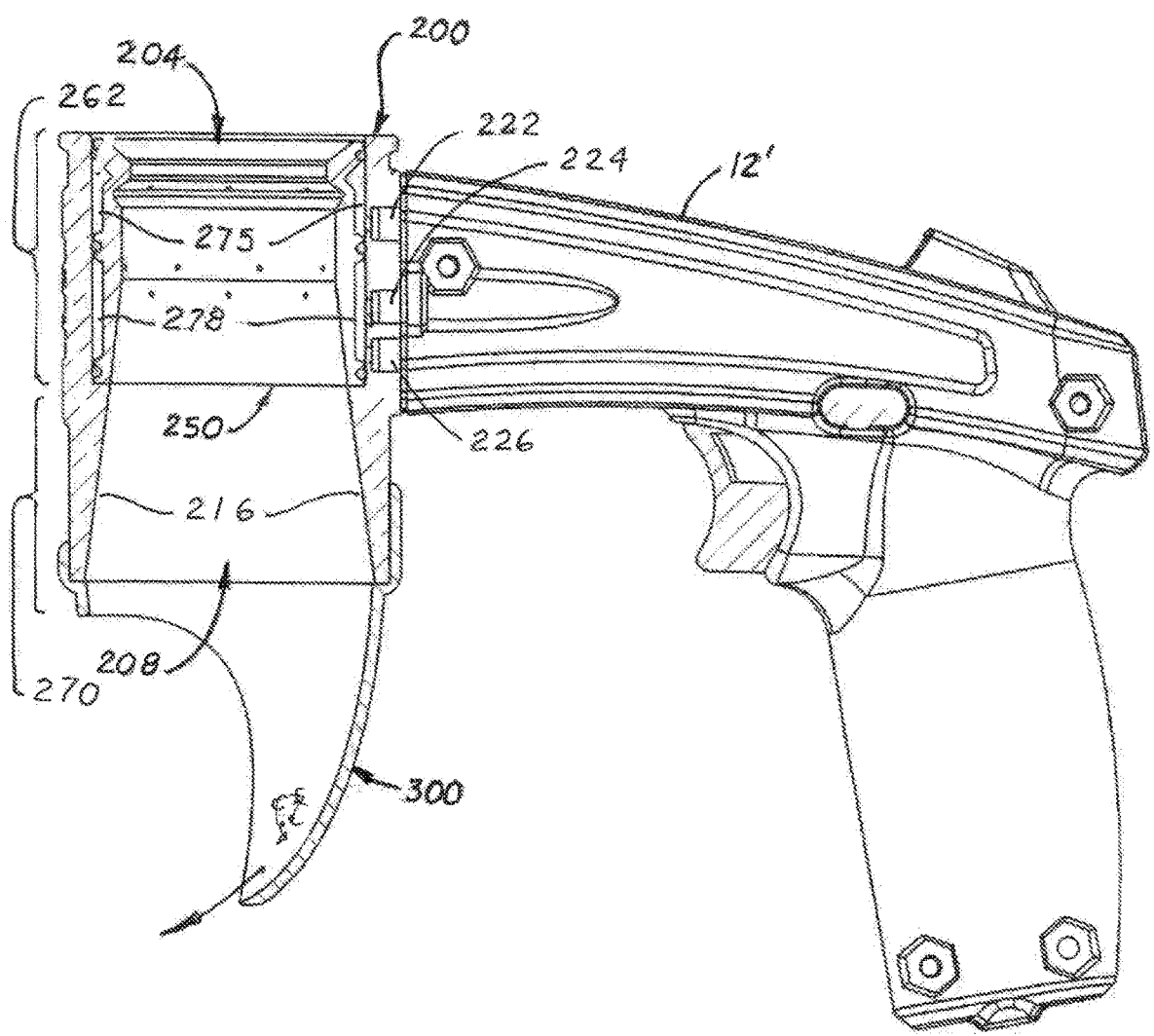
FIG. 15 is a side elevational view of one-half of the handpiece shown in FIG. 12.
Figure 16:
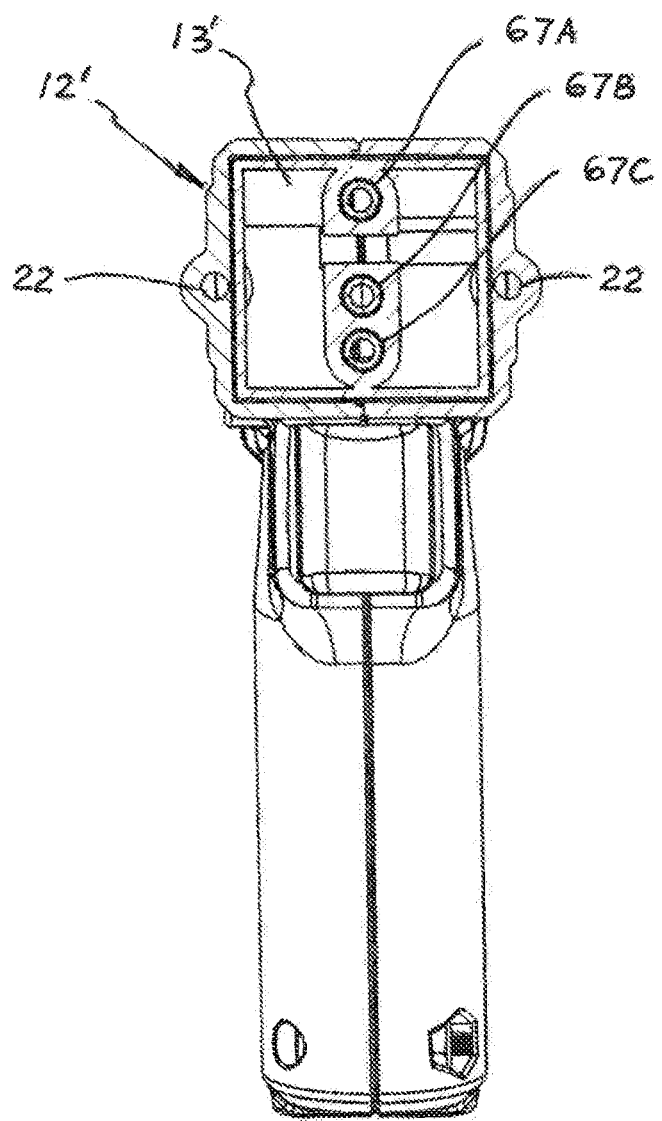
FIG. 16 is an end sectional view of the handpiece taken along line 16-16 in FIG. 13.
Figure 17:
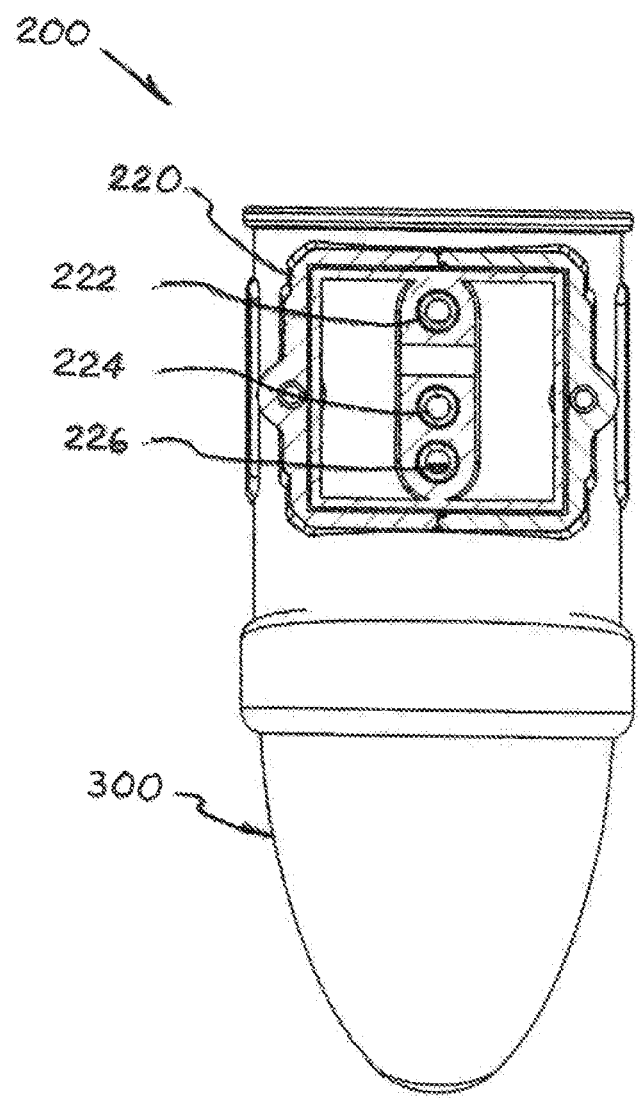
FIG. 17 is an end, sectional view of the spray cylinder taken along line 17-17 in FIG. 13.

The inflating member 140 includes a cylindrical bladder frame 150 that fits into the teat receiving body 50. As shown in FIG. 15, the bladder frame 150 includes a top opening 151, a bottom opening 152, and sidewalls 153 that converge in a downward direction forming a conical-shaped center passageway 155. Extending through a sidewall 153 is a laterally extending air inlet 154 that communicates with a center passageway 155 formed in the bladder frame 150. The air inlet 154 is located near the middle section of the bladder frame 150. Also formed on the bladder fame 150 is a small exhaust port 171 located on the opposite side of the bladder frame 105 that also communicates with the inner air cavity 170. Extending along the inside surface of the sidewall 152 and aligned with the exhaust port 171 formed on the bladder frame 150 is a circular channel 174.

Figure 23:
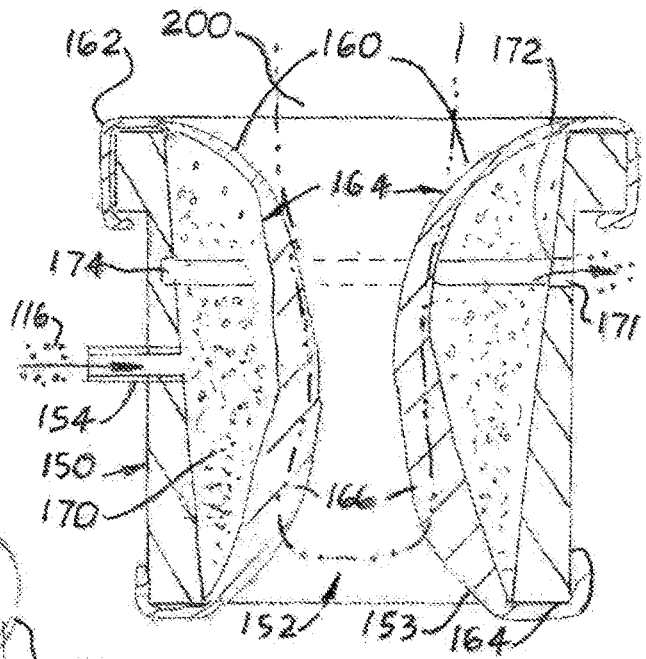
FIG. 23 is a sectional side elevational view of the lower support frame, and an elastic bladder sleeve placed therein.
Figure 24:
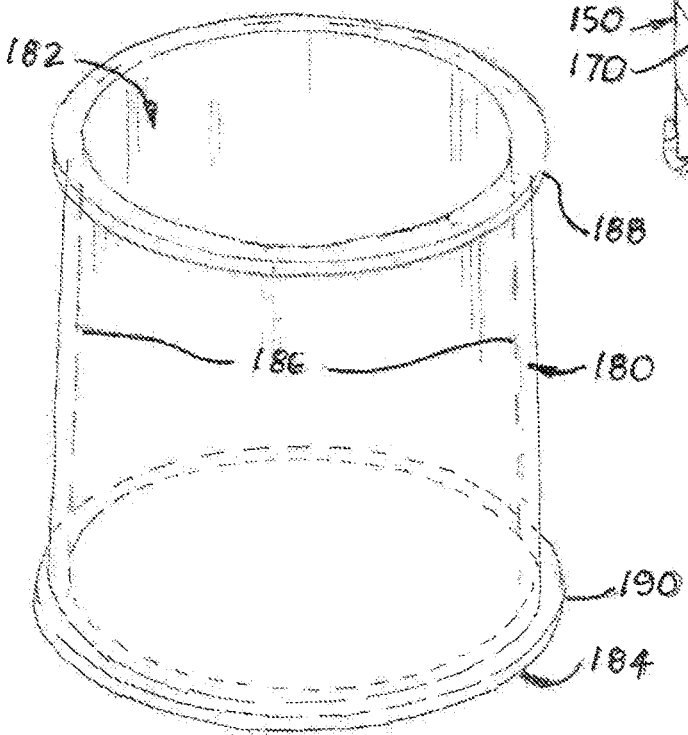
FIG. 24 is a perspective view of the lower support frame.
Figure 25:
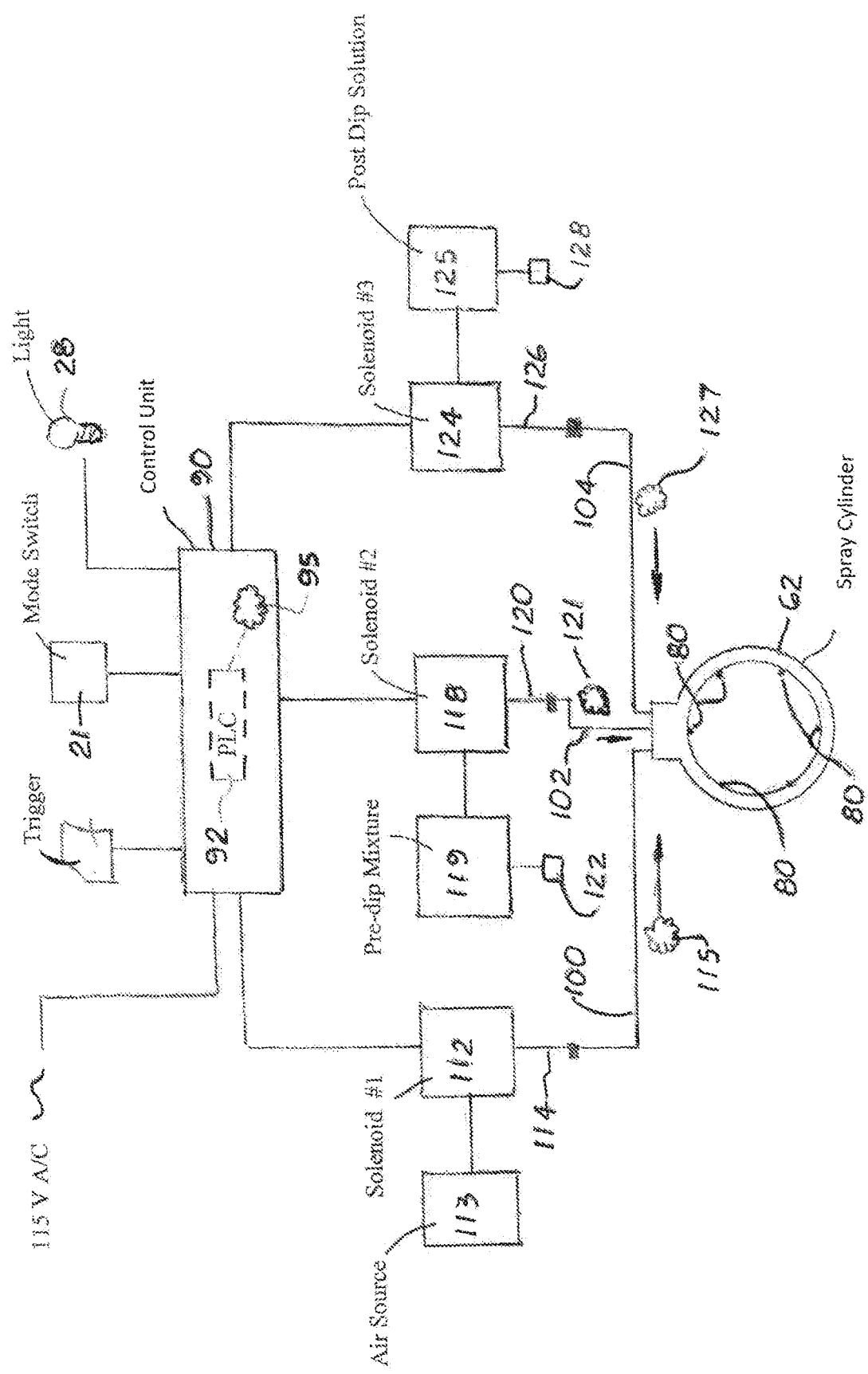
FIG. 25 shows the interconnections of the components used in the non-stripping embodiment shown in FIGS. 1-18.
Figure 26:
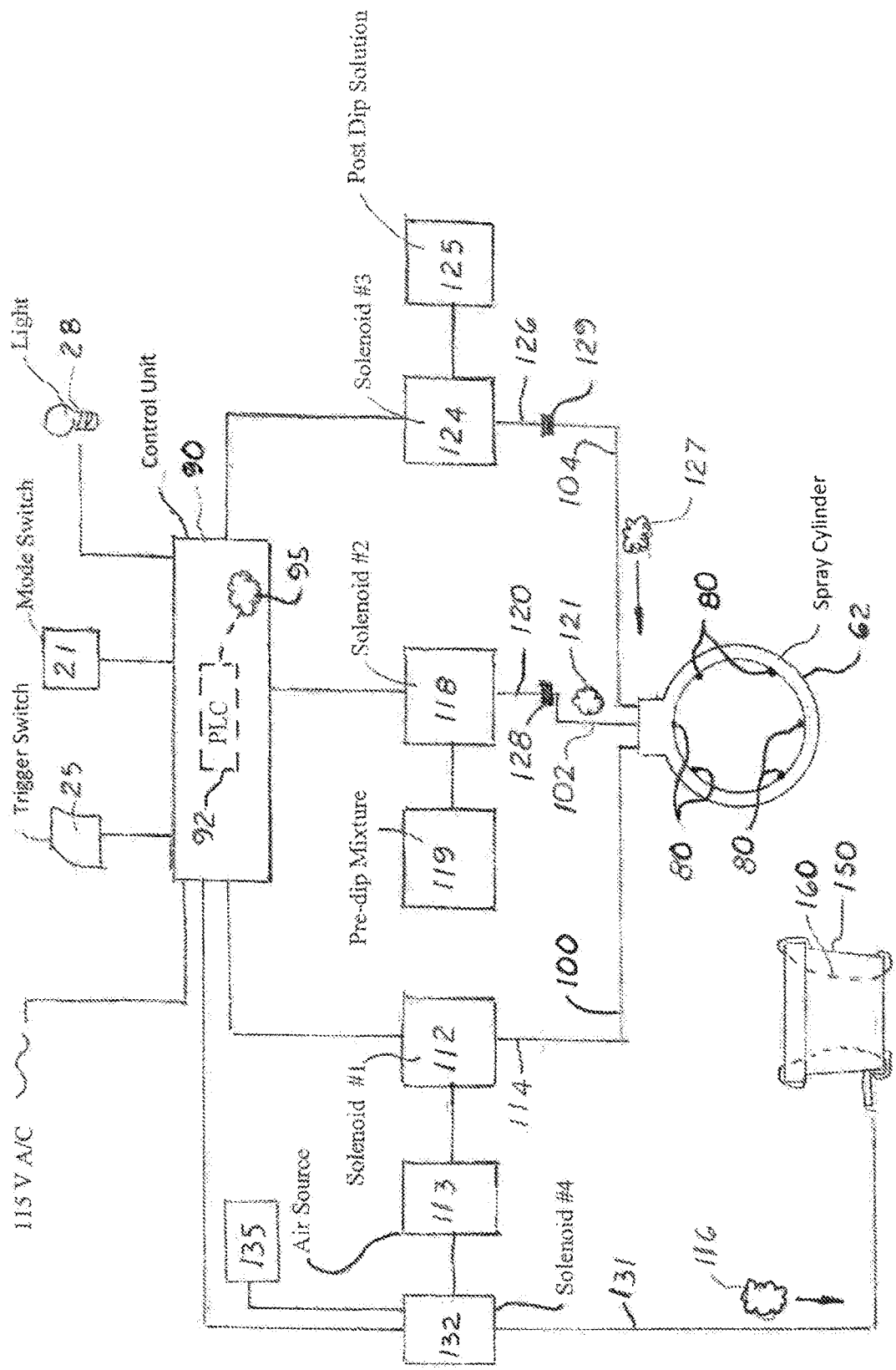
FIG. 26 is a diagram showing the interconnections of the components used in the system that uses the stripping embodiment shown in FIGS. 19-24.

As shown in FIG. 23, the bladder frame 150 rests on top of a short conical support structure 180 that fits inside the teat receiving body 50. The conical support structure 180 includes a top opening 182, and a bottom opening 184. Formed around the top opening 182 is a wide diameter upper lip 188. Formed around the inside diameter of the short conical support 180 are diverging sidewalls 186.

Located inside the bladder frame 150 is an elastic bladder sleeve 160 is configured to sequentially expand and relax repeatedly against the sides of a teat 5, The bladder sleeve 160 is a ballooning, cylindrical-shaped structure with thin upper sidewalls 164 (approx. 1 ml thick) relatively thick lower sidewalls 166 (approximately 3 to 4 mils thick). The bladder sleeve 160 includes a circular upper edge 162 configured to stretch over the upper edge of the bladder frame 150 and a lower edge 164 configured to stretch over the lower edge of the bladder frame 150. The upper and lower edges 162, 164 affix the bladder sleeve 160 to the bladder frame 150. The inside surface of the sidewalls of the bladder sleeve 160 extend inward and narrows from top to bottom and then extends outward to form an adjustable, hour-glass shape center passageway 166 in which the teat 5 is placed.

When the bladder sleeve 160 is assembled on the bladder frame 150, the center, outside sidewalls of the bladder sleeve 160 are detached from the bladder frame 150. An inner air space 170 is formed between the inside surface of the bladder frame 150 and the outside surface of the bladder sleeve 160. The air space 170 is partially closed so that air trapped inside the inner air space 170 escapes only through the exhaust port 171. Because the center passageway 166 has an hour-glass configuration and the thickness of the sidewall 164 of the bladder sleeve 160 is thinner in the upper portion and therefore more flexible than the lower portion of the bladder sleeve 160, the upper portion of the bladder sleeve 160 expands inward before the lower portion to gradually squeeze the teat 5 in a downward, wave-like manner. Because the upper portion of the bladder sleeve 160 is relatively thin (1 to 2 mls), low-pressure air 116 (approximately 50 PSI) must expand the bladder sleeve 160.

During use, delivery of the low-pressure air 116 to the inner air-spaced 170 is repeated, continued, and discontinued (called inflation/deflation cycles) to create a plurality of squeezing, milking-like movements against the teat 5. When delivery of the low-pressure air 116 is discontinued, the low-pressure air 116 in the inner air space 170 slowly escapes from the inner air space 170 via the exhaust port 171. Because the circular recessed channel 174 is formed in the inside surface of the bladder frame 150 that communicates with the exhaust hole 172, any air blocked by the collapsing bladder sleeve 160 may escape through the exhaust hole 172.

Delivery of the low-pressure air 116 is controlled by the PCL 92 and the modified software program 96. As shown in FIG. 19, the control unit 90 is connected to a fourth solenoid 132 that is connected to a low-pressure air source 135 (approximately 50 PSI). It should be understood that the fourth solenoid 132 may be connected to high-pressure air source 113 and configured to lower the air pressure from 150 PSI to approximately 50 PSI. A conduit 133 runs from the fourth solenoid 132 to the handpiece 12 and the air outlet conduit 156 inside the handpiece 12 and then to the bladder frame 150.

Operation of Stripping Embodiment

The washing stage and drying stage used in this embodiment is identical to the washing and drying stages used in the first two embodiments shown in FIG. 1-18. The only difference is that in the third embodiment, is the ability to strip the teat 5 after applying the pre-dip solution 121.

Immediately after the drying step in the pre-dip application stage is completed, the software program 95 and PCL 92 automatically begin a stripping mode that involves opening and closing the fourth solenoid 132 connected to the lower pressure source 135 or the high pressurized air source 113. The fourth solenoid 132 connects to an external conduit 133, connecting to an air outlet conduit 156 inside the handpiece 12. The air outlet conduit 156 connects to the inner air space 170. Air escapes from the inner air space 170 via the exhaust port 171.

The cyclic, ON/OFF operation of the fourth solenoid 132 is controlled by the PCL 90 and the software program 95.

During the stripping stage, 3 to 4 inflation and deflation cycles are performed. Each cycle consists of delivering low pressurized air 116 to the inner air space 170 for approximately 0.5 seconds followed by a discontinuation period of approximately 0.5 seconds which enables the low pressurized air 116 to escape. After the stripping step has been completed, the operator then moves the mode switch 21 to the second mode operation position. When the operator then presses the trigger 25, the PCI 92 is activated and runs the post-dip application mode routine, which opens the first solenoid 112 (high-pressure air). When trigger 25 is released, the third solenoid 124 opens to deliver post-dip solution 127 to the nozzles 80. When the trigger 25 is released, the first solenoid 112 remains open for 0.25 to (0.5) seconds, allowing high-pressure air 115 to be released from the nozzles 80 and mixed with the post-dip solution 127 and atomize the last volume of post-dip solution 127 exiting the nozzles 80. The third solenoid 124 remains open 0.25 to 0.5 sec after the first solenoid 112 closes so the entire teat 5 is wetted with a layer of post-dip solution 127.

In summary, the above system 8 uses high-pressure air delivered to a handpiece 12 to apply a pre-dip solution 121 and a post-dip solution 127 to a teat 5. The handpiece 12 includes a spray cylinder 62 or a stripping spray cylinder 130 with nozzles 80 to evenly spray high-pressure air 115, the pre-dip solution 121, and post-dip solution 127 around the teat 5. Below the spray cylinder, 62 or the stripping spray cylinder 130 is a venturi-generated device that creates a vacuum that draws and stretches the teat 5 inside the teat receiving body. System 8 can also be easily modified to include a stripping feature that strips the teat 5 before applying the post-dip solution 127.

In compliance with the statute, the invention described has been described in language more or less specific as to structural features. It should be understood, however, that the invention is not limited to the specific features shown, since the means and construction is shown, comprises the preferred embodiments for putting the invention into effect. The invention is therefore claimed in its forms or modifications within the legitimate and valid scope of the amended claims, appropriately interpreted under the doctrine of equivalents.

We claim:

1. A teat preparation apparatus, comprising:
   a. a handpiece including a high-pressure air conduit, a pre-dip conduit, and a post-dip conduit, said high-pressure air conduit connects to a high-pressure air source, said pre-dip conduit connects to a pre-dip solution source, and said post-dip conduit connects to a post-dip solution source;
   b. a teat receiving body located on said handpiece, said teat receiving body including sidewalls that form a center bore, and a high-pressure air port that connects to said high-pressure air conduit, a pre-dip port that connects to said pre-dip conduit and a post-dip port that connects to said post-dip conduit, said high-pressure air port being located above said pre-dip port and said post-dip port;
   c. a spray cylinder located inside said central bore in said teat receiving body, said spray cylinder including sidewalls that form a central bore configured to fit around a teat, when said spray cylinder is placed inside said central bore, an upper circular raceway is formed between said sidewalls of said spray cylinder and said sidewalls of said teat receiving body that communicates with said high-pressure air port, and a lower circular raceway that communicates with said pre-dip port and said post-dip port;
   d. a set of nozzles formed on said spray cylinder adjacent to said upper circular raceway configured to deliver said high-pressure air to said central bore;
   e. a second set of nozzles formed on said spray cylinder adjacent to said lower circular raceway configured to deliver said pre-dip solution and said post-dip solution to said central bore; and
   f. a deflection cap extending downward from said teat receiving body.

2. The teat preparation handpiece as recited in claim 1, further including said handpiece connected to a control unit coupled to said high-pressure air source, said pre-dip solution source, and said post-dip solution source.

3. The teat preparation handpiece, as recited in claim 2, further including a mode switch and a trigger switch located on said handpiece coupled to said control unit that controls the delivery of said high-pressure air, said pre-dip solution and said post-dip solution to said handpiece.

4. The teat preparation handpiece as recited in claim 3, wherein said mode switch on said handpiece is configured to send a signal to said control unit when said mode switch is placed in a first mode position and said trigger is activated, instructing said control unit to deliver both said high-pressure air and said pre-dip solution to said handpiece, said mode switch is configured to send a signal to said control unit when in a second mode position and said trigger is activating instructing said control unit to deliver said high-pressure air and said post-dip solution to said spray cylinder.

5. The teat preparation handpiece, as recited in claim 1, wherein said sidewalls of said spray cylinder have an inside surface that extends downward and diverge.

6. The teat preparation handpiece as recited in claim 1, further including o-rings disposed between said spray cylinder and said teat body, said o-rings configured to prevent leakage of said high pressure air delivered to said upper circular raceway into said lower circular raceway and prevent leakage of said pre-dip solution and said post-dip solution from said lower circular raceway into said upper circular raceway.

7. A handheld teat preparation apparatus configured to selectively dispense a pre-dip solution to a teat prior to milking, and selectively dispense a post-dip solution to said teat after milking, said handheld teat preparation apparatus, comprising:
   a. a handpiece including a teat receiving body with a top opening, a bottom opening and cylindrical sidewalls that form a center bore configured to receive a teat, said teat receiving body includes a high-pressure air port configured to receive high-pressure air, a pre-dip port configured to receive a pre-dip solution and a post dip port configured to receive a post-dip solution;
   b. an upper circular raceway and a lower circular raceway formed in said teat receiving body, both said upper circular raceway and said lower circular raceway extending around said center bore, said upper circular raceway communicates with said high-pressure air port to receive high pressure air and said lower circular raceway communicates with said pre-dip port and said post-dip port to received said pre-dip solution and said post-dip solution, said upper circular raceway and said lower circular raceways being isolated from each other so that said high pressure air delivered to said upper circular raceway does not flow into said lower circular raceway and said pre-dip solution or said post dip solution delivered to said lower circular raceway does not flow into said upper circular raceway;

c. a first set of nozzles formed on said sidewalls of said teat receiving body that communicates with said upper circular raceway to deliver said high-pressure air to said center bore;

d. a second set of nozzles formed on said sidewalls of said teat receiving body, said second set of nozzles being located below said first set of nozzles and communicates with said lower circular raceway to deliver said pre-dip solution or said post-dip solution to said center bore; and, e. a high-pressure air source that delivers high-pressure air to said high-pressure air port;

f. a pre-dip solution source that delivers said pre-dip solution to said pre-dip port;

g. and a post-dip solution source that delivers said post-dip solution to said post-dip port;

h. a control unit connected to said high-pressure air source, to said pre-dip solution source, and to said post-dip solution source, said control unit configured to control the flow of said high-pressure air from said high-pressure air source to said handpiece, control the flow of said pre-dip solution from said pre-dip solution source to said handpiece, and control the flow of said post-dip solution from said post-dip source to said handpiece.

8. The teat preparation handpiece as recited in claim 7, further including a mode switch and a trigger switch located on said handpiece, said mode switch is configured to selectively move between a first position and a second position, when said mode switch is moved to said first position and said trigger is activated, said control unit delivers both said high-pressure air and said pre-dip solution to said handpiece.

9. The teat preparation handpiece as recited in claim 8, wherein when said mode switch is selectively moved to a second position and said trigger is activated, said control unit delivers both said high-pressure air and said post-dip solution to said handpiece.

10. The teat preparation handpiece as recited in claim 8 wherein said control unit is configured so that when said mode switch is moved to said first position and said trigger is activated and then released, said control unit discontinues the delivery of said pre-dip solution and continues the delivery of said high-pressure air to said handpiece for a predetermined amount of time.

11. The teat preparation handpiece as recited in claim 7, further including a mode switch and a trigger switch located on said handpiece, said mode switch is configured to selectively move to a first position and a second position, when said mode switch is selectively moved to said second position and said trigger is activated, said control unit delivers both said high-pressure air and said post-dip solution to said handpiece.

12. The teat preparation handpiece as recited in claim 11 wherein said control unit is configured so that when said mode switch is moved to said first position and said trigger is activated and then released, said control unit discontinues the delivery of said pre-dip solution and continues the delivery of said high-pressure air to said handpiece for a predetermined amount of time.

13. The teat preparation handpiece, as recited in claim 7, further including a spray cylinder inserted into said center bore and fits against said sidewalls of said teat receiving body to form said upper circular raceway and said lower circular raceway.

14. The teat preparation handpiece as recited in claim 13 further including o-rings disposed between said spray cylinder and said sidewalls of said teat body, said o-rings begin located around said upper circular raceway and said lower circular raceway to prevent leakage of said high-pressure air delivered to said upper circular raceway into said lower circular raceway and prevent leakage of said pre-dip solution and said post-dip solution delivered to said lower circular raceway into said upper circular raceway.

\* \* \* \* \*